US012812044B2

(12) United States Patent
Oki et al.

(10) Patent No.: US 12,812,044 B2
(45) Date of Patent: Nov. 24, 2026

(54) INFORMATION PROCESSING SYSTEM FOR PERFORMING DIAGNOSIS ON IMAGE, AND GENERATES DISPLAY SCREEN IN WHICH ACQUIRED DIAGNOSIS RESULTS ARE ARRANGED IN PREDETERMINED ORDER

(71) Applicant: FUJIFILM Business Innovation Corp., Tokyo (JP)

(72) Inventors: Tomoya Oki, Kanagawa (JP); Yuki Tanaka, Kanagawa (JP); Naoto Saito, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/448,167

(22) Filed: Aug. 11, 2023

(65) Prior Publication Data

US 2024/0291920 A1 Aug. 29, 2024

(30) Foreign Application Priority Data

Feb. 27, 2023 (JP) ................................ 2023-028571

(51) Int. Cl.
*H04N 1/00* (2006.01)
*H04N 1/60* (2006.01)

(52) U.S. Cl.
CPC ..... *H04N 1/00029* (2013.01); *H04N 1/00039* (2013.01); *H04N 1/6033* (2013.01)

(58) Field of Classification Search
None
See application file for complete search history.

(56) References Cited

U.S. PATENT DOCUMENTS 10,798,255 B2 * 10/2020 Kodama ................ H04N 1/409
2003/0098990 A1 * 5/2003 Nakamura ............ G06F 3/1213 358/1.14
2007/0052992 A1 3/2007 Yamada
2011/0019245 A1 1/2011 Adachi
2016/0101638 A1 * 4/2016 Ukishima .............. B41J 29/393 347/19
2017/0064095 A1 * 3/2017 Matsuzaki ......... H04N 1/00029
2017/0208217 A1 * 7/2017 Soriano .............. H04N 1/00061
2020/0259967 A1 8/2020 Onishi (Continued)

FOREIGN PATENT DOCUMENTS

JP 2013213105 10/2013
JP 2015076009 4/2015

(Continued)

OTHER PUBLICATIONS

"Office Action of Europe Counterpart Application", issued on Jul. 8, 2025, pp. 1-8.

(Continued)

*Primary Examiner* — Haris Sabah
(74) *Attorney, Agent, or Firm* — JCIPRNET

(57) ABSTRACT

An information processing system includes a processor configured to acquire a diagnosis result for each of plural diagnostic items, the diagnosis result being a result of diagnosing an image formed on a recording medium, rearrange the acquired plural diagnosis results such that the plural diagnosis results are arranged in a predetermined order, and generate a screen in which the plural diagnosis results are arranged in the predetermined order.

13 Claims, 19 Drawing Sheets

(56) References Cited

U.S. PATENT DOCUMENTS

| | | | | |
|---|---|---|---|---|
| 2023/0142554 | A1* | 5/2023 | Miyata | G06V 30/413 358/1.14 |
| 2024/0286419 | A1* | 8/2024 | Miyamori | H04N 1/00015 |
| 2024/0291921 | A1* | 8/2024 | Saito | H04N 1/00013 |

FOREIGN PATENT DOCUMENTS

| | | |
|---|---|---|
| JP | 2020149531 | 9/2020 |
| JP | 2020182415 | 11/2020 |
| JP | 7081376 | 6/2022 |

OTHER PUBLICATIONS

"Search Report of Europe Counterpart Application", issued on Jan. 19, 2024, p. 1-p. 9.

* cited by examiner

FIG. 4

95

4A 4B 4C

| NO. | DIAGNOSTIC ITEM | DIAGNOSIS RESULT | COPING METHOD |
|---|---|---|---|
| 1 | DENSITY | 12 | aaaaa |
| 2 | STREAK | 20 | bbbbbb |
| 3 | AFTERIMAGE | 72 | cccccc |
| 4 | LINE REPRODUCTION | 87 | dddddd |
| 5 | DOT | 88 | eeeeee |
| 6 | UNEVENNESS | 90 | ffffff |
| 7 | BANDING | 98 | ggggg |
| 8 | COLOR REGISTER | 99 | hhhhh |

FIG. 5

95

| NO. | DIAGNOSTIC ITEM | DIAGNOSIS RESULT | COPING METHOD |
|---|---|---|---|
| 1 | DENSITY | 12 | aaaaa |
| 2 | STREAK | 20 | bbbbbb |
| 3 | UNEVENNESS | 90 | ffffff |
| 4 | BANDING | 98 | ggggg |

FIG. 8

DIAGNOSTIC ITEM

| GROUP | DENSITY | UNEVENNESS | AFTERIMAGE | STREAK | DOT | COLOR REGISTER | LINE REPRODUCTION | BANDING |
|---|---|---|---|---|---|---|---|---|
| NATURAL IMAGE QUALITY | O | O | × | × | × | × | × | O |
| TEXT LINE QUALITY | × | × | × | × | × | O | O | × |
| IMAGE DEFECTIVE QUALITY | × | × | O | O | O | × | × | × |

O: DEPENDENT ×: NON-DEPENDENT

95

| NO. | DIAGNOSTIC ITEM | DIAGNOSIS RESULT | COPING METHOD |
|---|---|---|---|
| 1 | STREAK | 20 | bbbbbb |
| 2 | AFTERIMAGE | 72 | cccccc |
| 3 | LINE REPRODUCTION | 87 | dddddd |
| 4 | DOT | 88 | eeeeee |
| 5 | UNEVENNESS | 90 | ffffff |
| 6 | BANDING | 98 | ggggg |
| 7 | COLOR REGISTER | 99 | hhhhh |
| 8 | DENSITY | 99 | aaaaa |

NEW SCREEN

FIG. 11

11C 11B 11A 11D 11E

| DIAGNOSTIC ITEM | C | M | Y | K | DIAGNOSIS RESULT | DIAGNOSTIC ITEM GROUP AND EVALUATION INFORMATION | |
|---|---|---|---|---|---|---|---|
| GRANULAR | 100 | 100 | 100 | 100 | 100 | NOISE | 100 |
| MOTTLE | 100 | 100 | 100 | 100 | 100 | | |
| RESOLUTION | 60 | 100 | 100 | 100 | 90 | SHARPNESS | 80 |
| CONTRAST | 70 | 70 | 70 | 70 | 70 | | |
| PERIODIC UNEVENNESS | 100 | 20 | 20 | 60 | 50 | DEFECT | 70 |
| SUDDEN STREAK | 100 | 100 | 100 | 60 | 90 | | |
| TONE JUMP | 100 | 100 | 100 | 100 | 100 | GRADATION | 100 |
| TEXT | 100 | 100 | 100 | 100 | 100 | TEXT | 100 |

95

| DIAGNOSTIC ITEM GROUP | EVALUATION INFORMATION |
|---|---|
| NOISE | 100 |
| SHARPNESS | 80 |
| DEFECT | 75 |
| GRADATION | 100 |
| TEXT | 100 |

INFORMATION PROCESSING SYSTEM FOR PERFORMING DIAGNOSIS ON IMAGE, AND GENERATES DISPLAY SCREEN IN WHICH ACQUIRED DIAGNOSIS RESULTS ARE ARRANGED IN PREDETERMINED ORDER

CROSS-REFERENCE TO RELATED APPLICATIONS

This application is based on and claims priority under 35 USC 119 from Japanese Patent Application No. 2023-028571 filed Feb. 27, 2023.

BACKGROUND

(i) Technical Field

The present invention relates to an information processing system, a non-transitory computer readable medium storing a program, and an information processing method.

(ii) Related Art

In JP2020-149531A discloses an apparatus including a data storage unit that stores at least one of detection information or an abnormality score in a predetermined section in a storage device and an output control unit that outputs at least one of the stored detection information or abnormality score in the predetermined section to an output device.

JP2015-76009A discloses a process of receiving an input of image reproduction information regarding image reproduction of each of a plurality of image forming apparatuses.

SUMMARY

Diagnosis may be performed on an image formed on a recording medium by an image forming apparatus, and a screen displaying a result of this diagnosis may be generated.

Here, in a case where the display position of the diagnosis result is fixed and does not change, for example, a situation in which a result of which a user is to be preferentially notified is buried in other results, and it is difficult to notify the user of the result of which a user is to be preferentially notified may occur.

Aspects of non-limiting embodiments of the present disclosure relate to an information processing system, a non-transitory computer readable medium storing a program, and an information processing method that easily notify a user of a result of diagnosing an image formed on a recording medium, as compared with a case where a display position of the result of diagnosing the image formed on the recording medium is fixed and does not change.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing system including a processor configured to acquire a diagnosis result for each of a plurality of diagnostic items, the diagnosis result being a result of diagnosing an image formed on a recording medium, rearrange the acquired plurality of diagnosis results such that the plurality of diagnosis results are arranged in a predetermined order, and generate a screen in which the plurality of diagnosis results are arranged in the predetermined order.

BRIEF DESCRIPTION OF THE DRAWINGS

Exemplary embodiment(s) of the present invention will be described in detail based on the following figures, wherein:

FIG. 4 is a diagram illustrating an example of a screen generated by a CPU;

FIG. 5 is a diagram illustrating another example of the screen generated by the CPU of the server apparatus;

Figure 7:
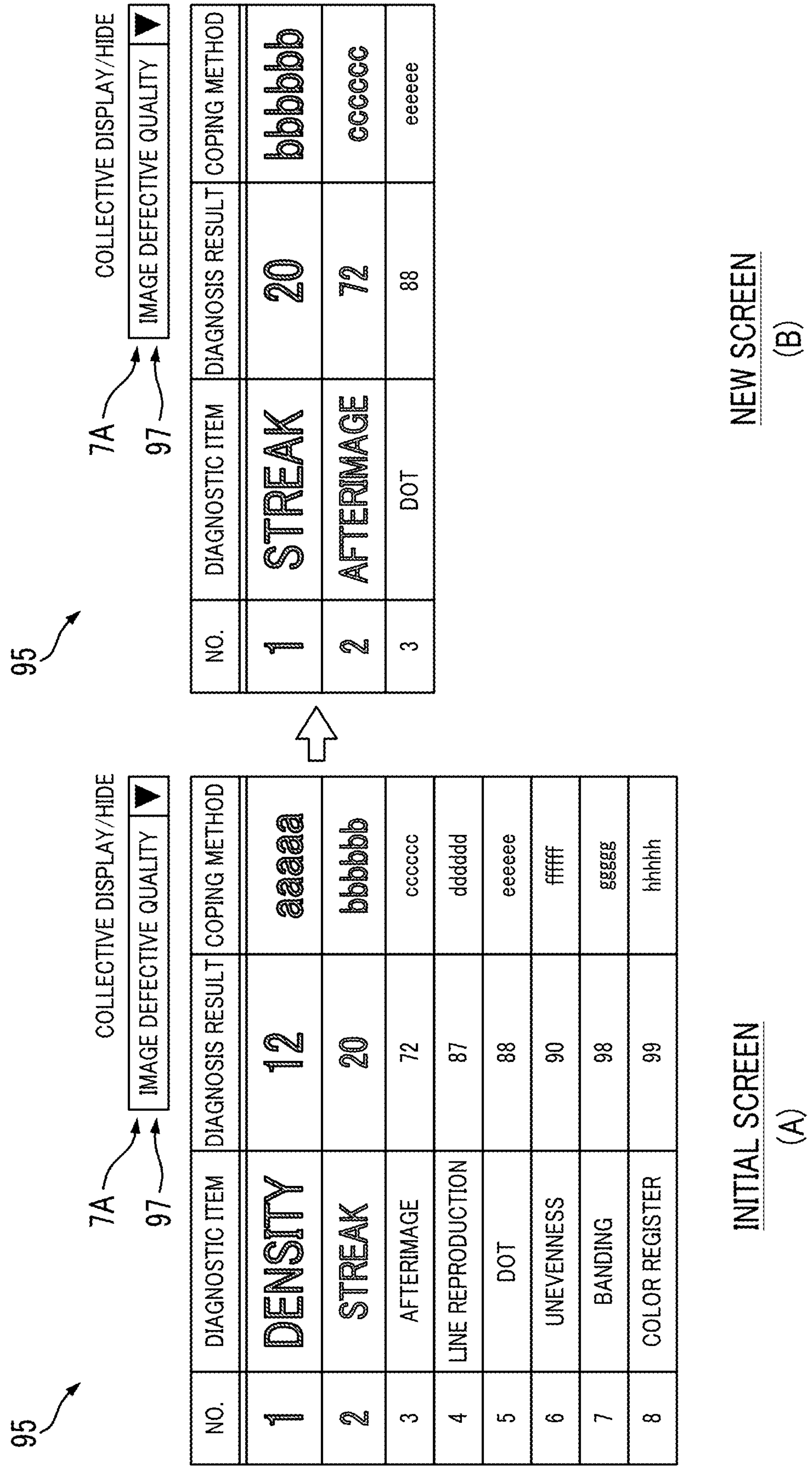
Figure 9:
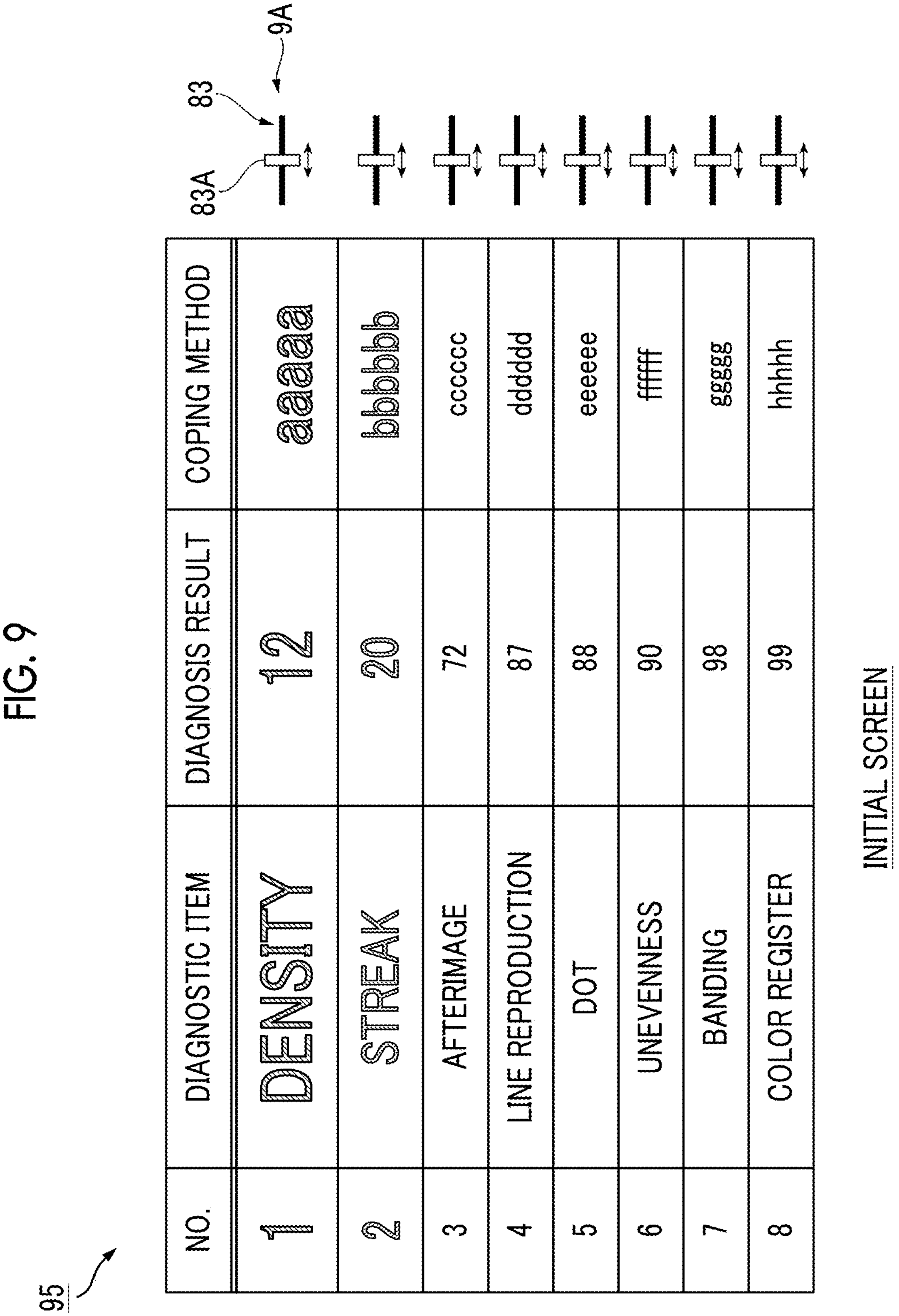
Figure 10:
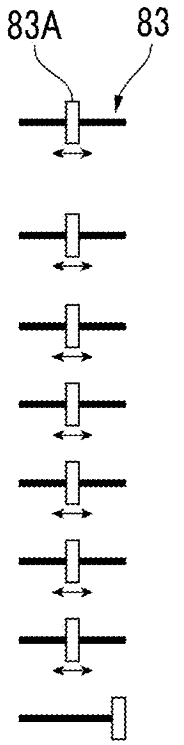
Figure 12:
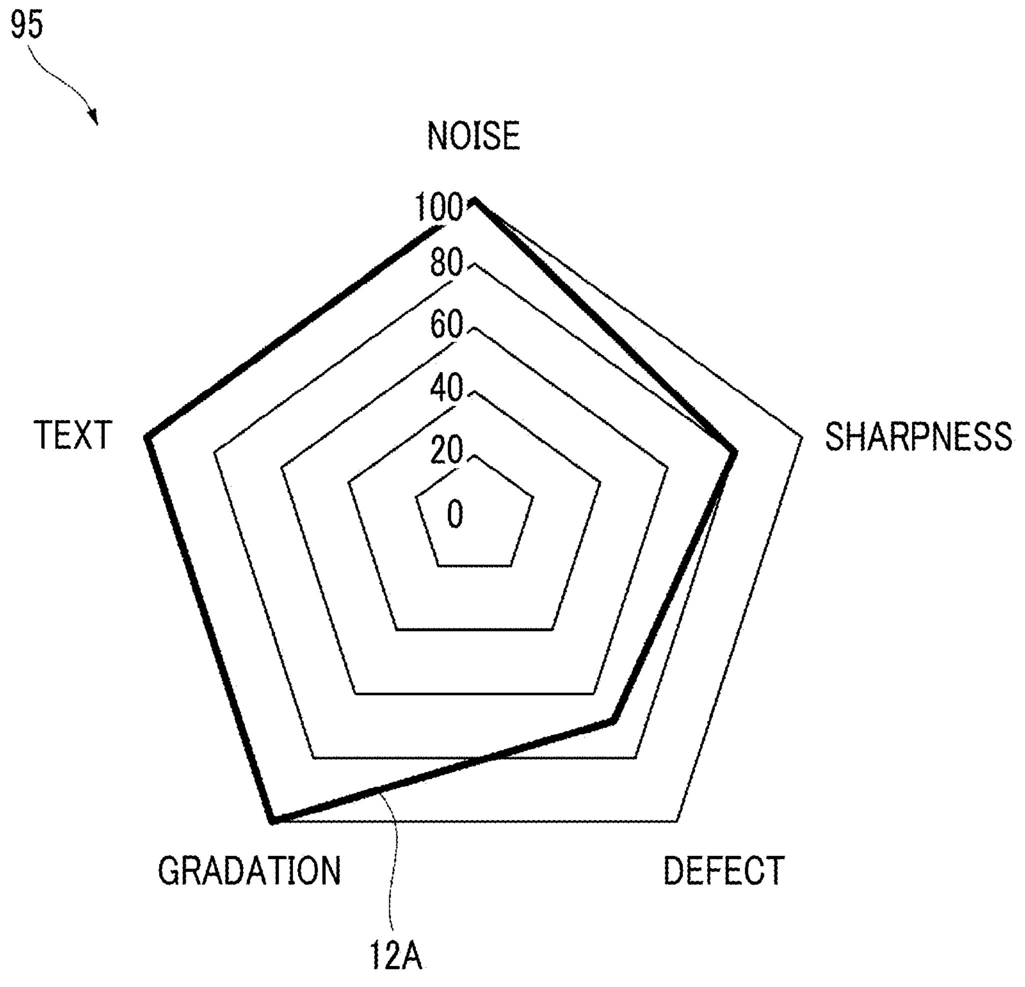
Figures 13A, 13B:
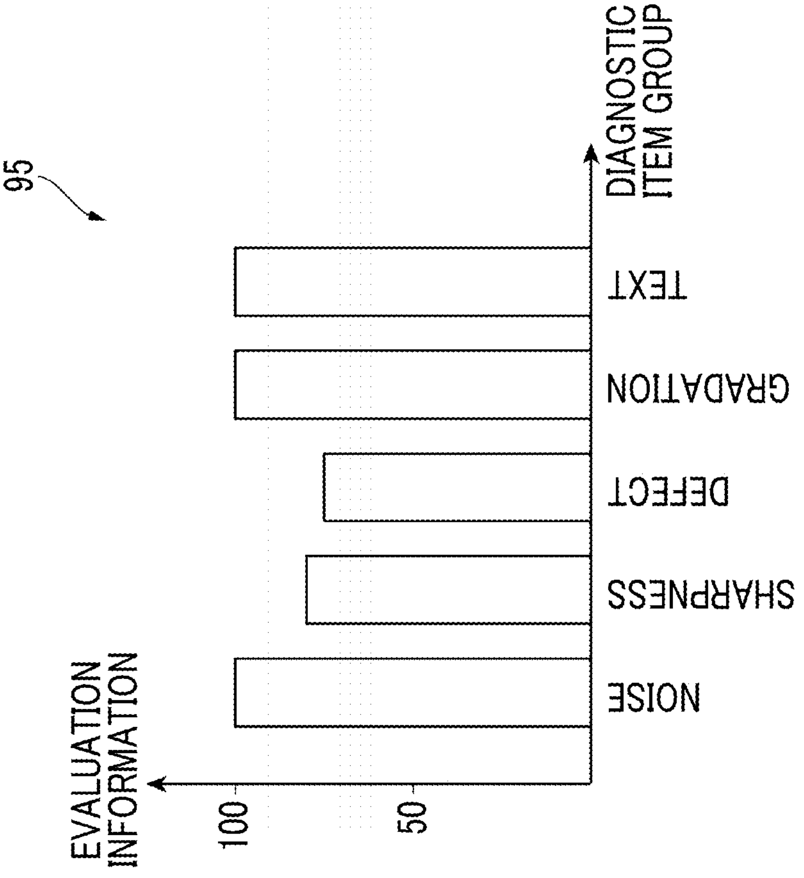
Figure 14:
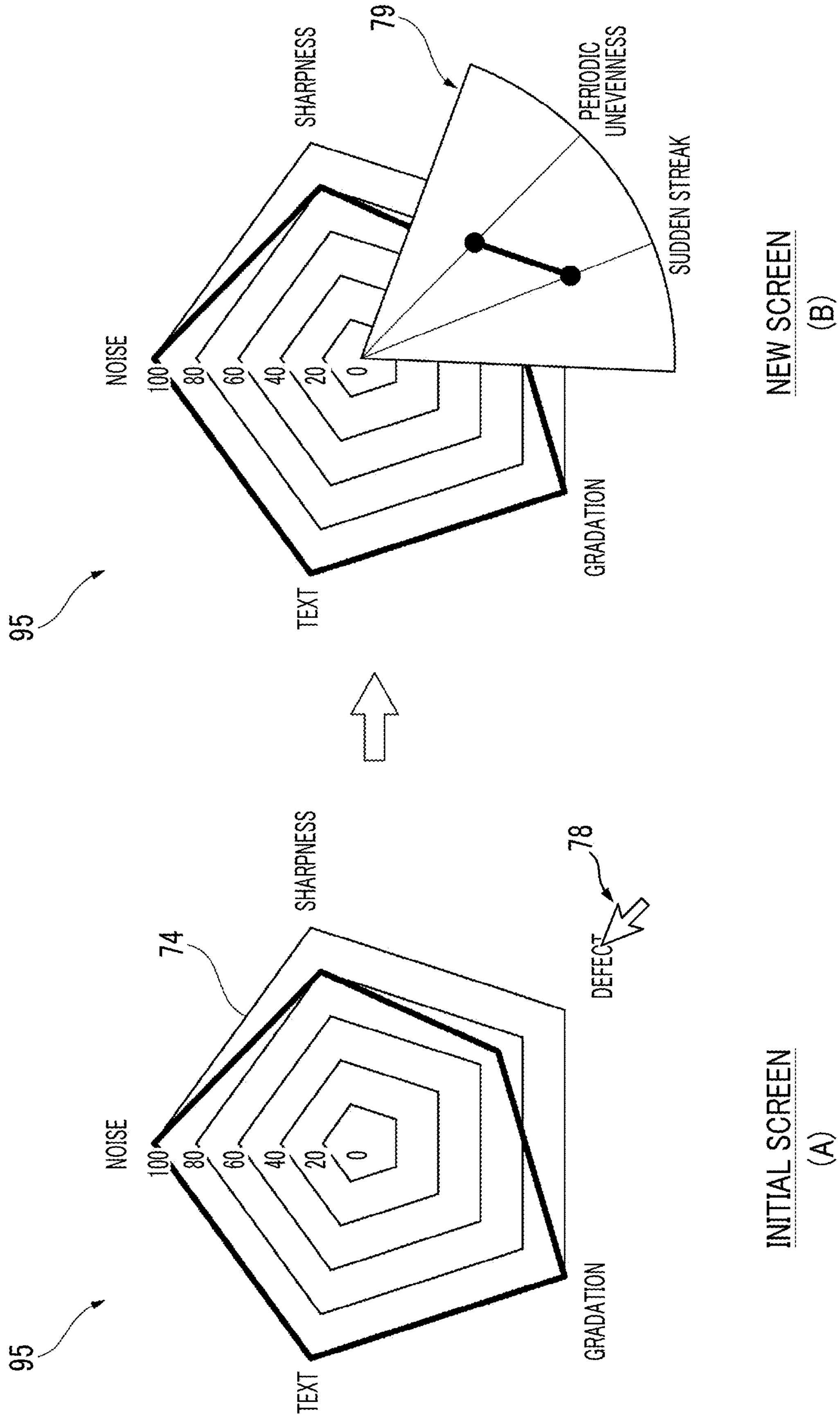
Figure 15:
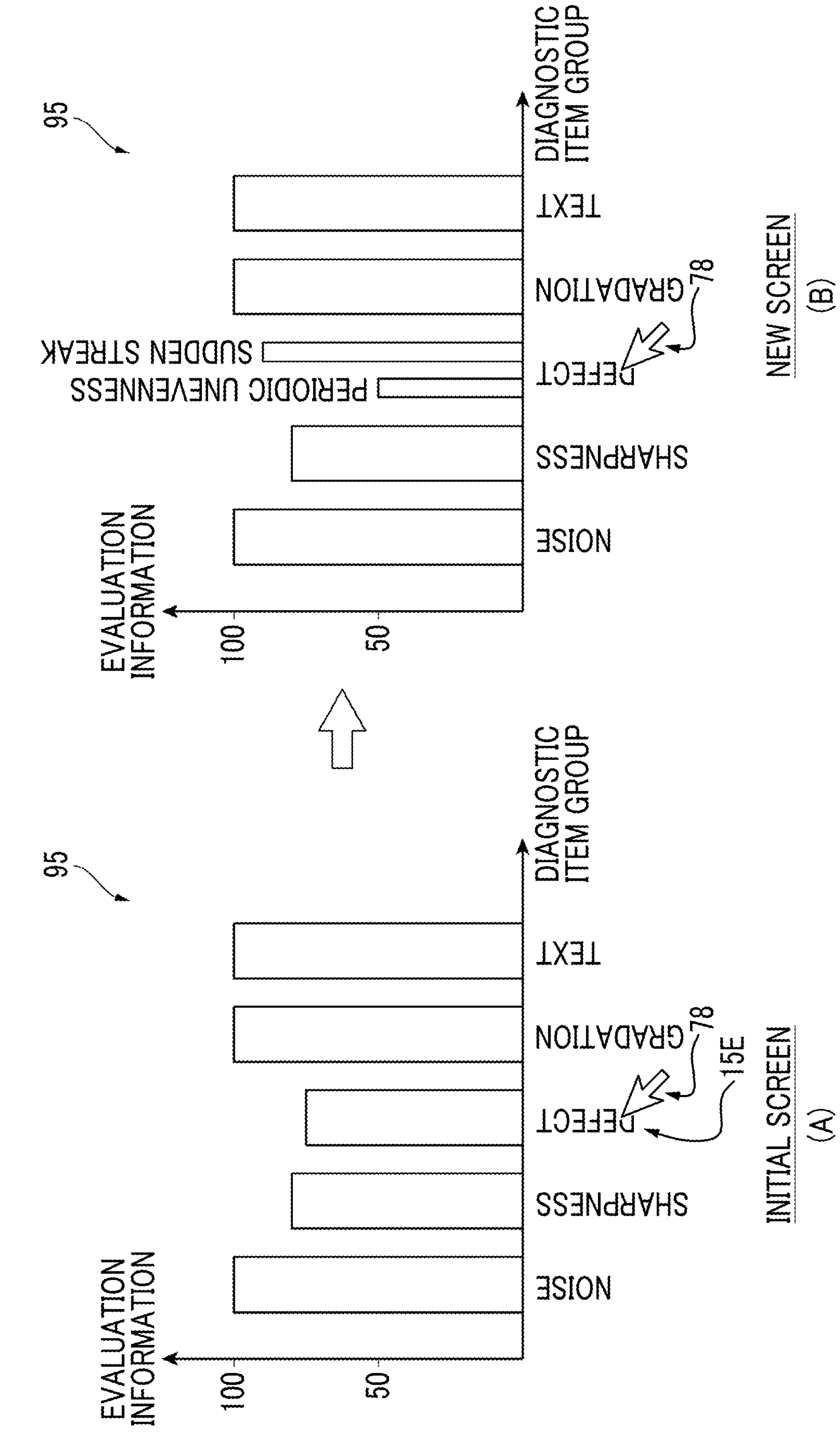
Figure 16:
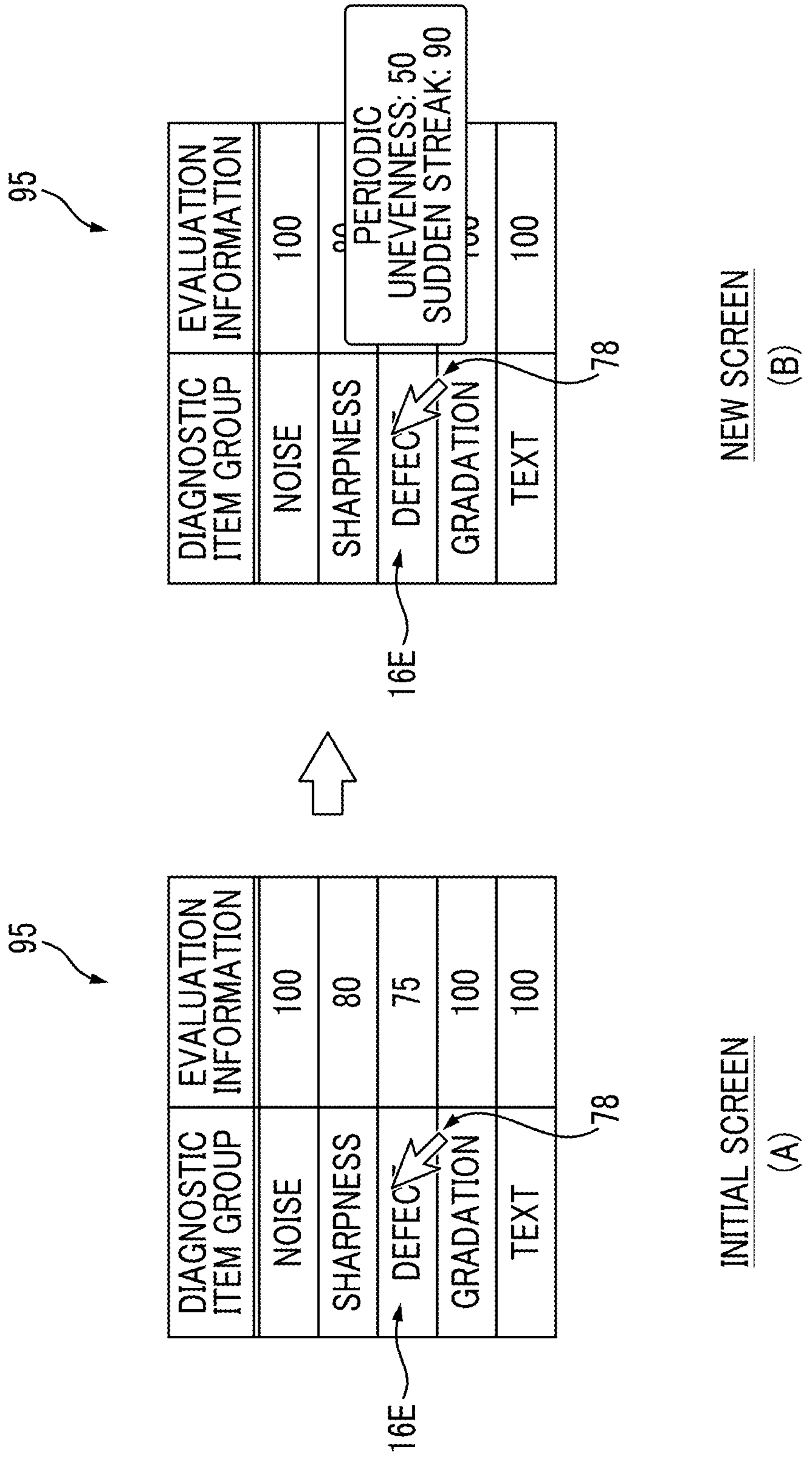
Figure 17:
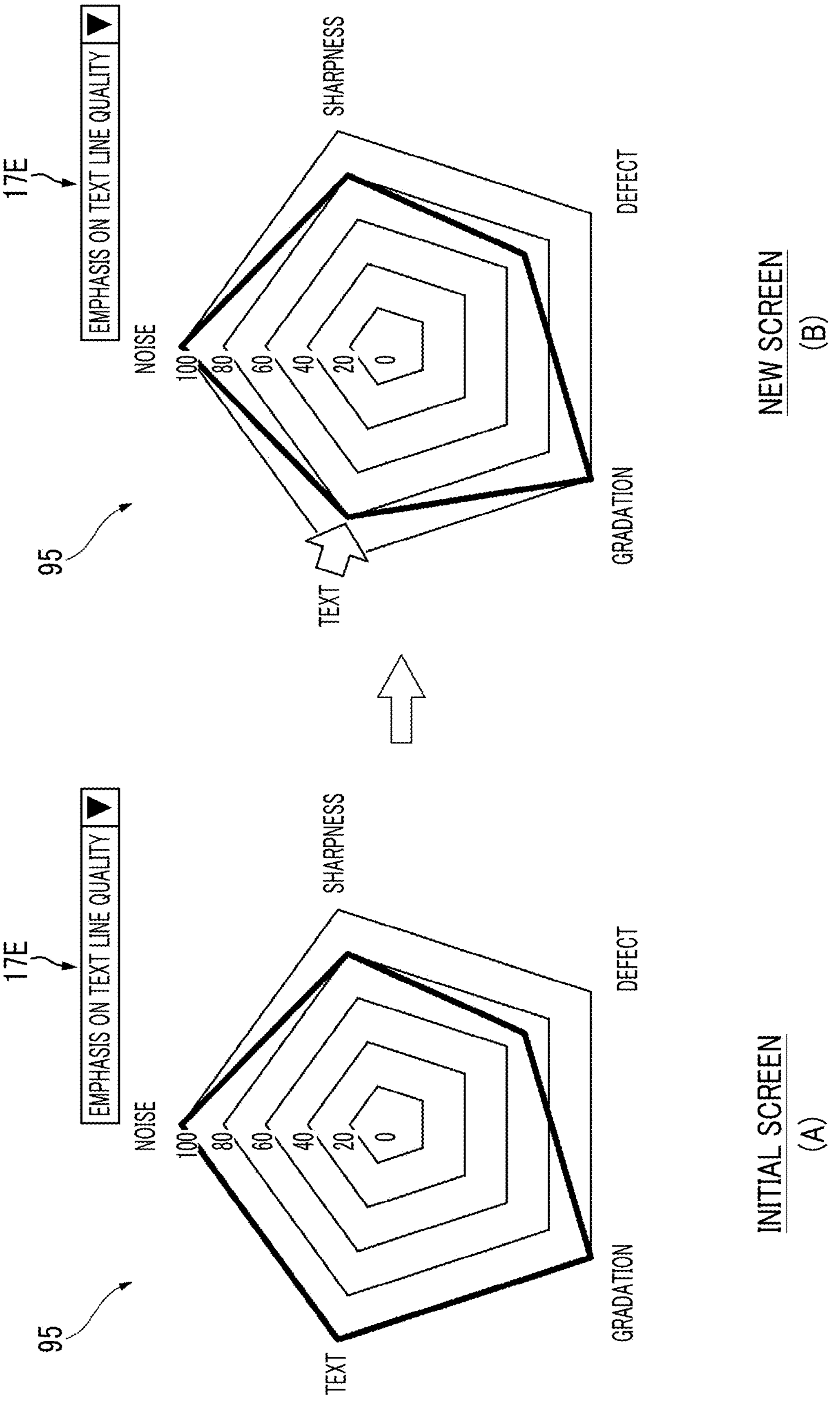
Figure 18:
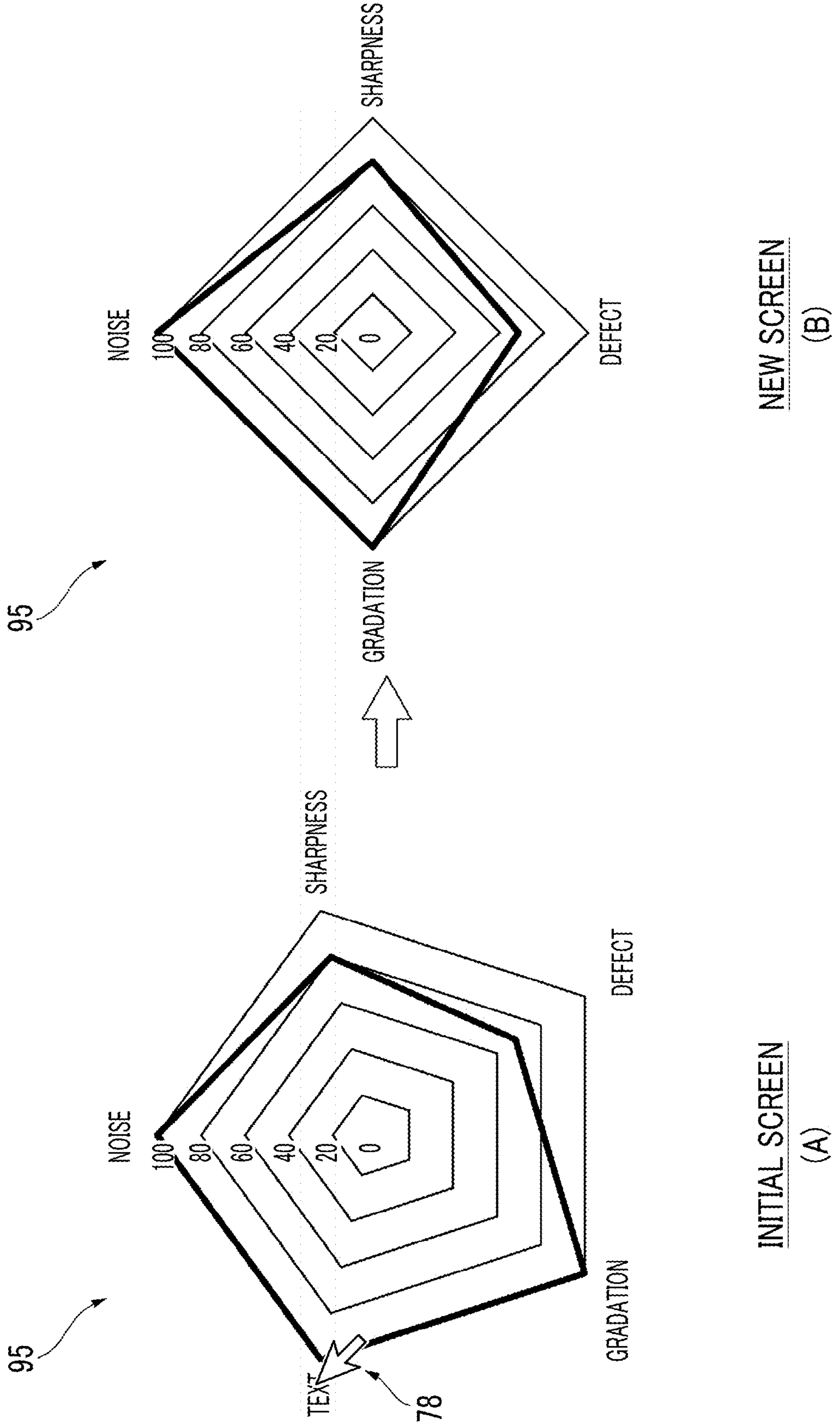
Figure 19:
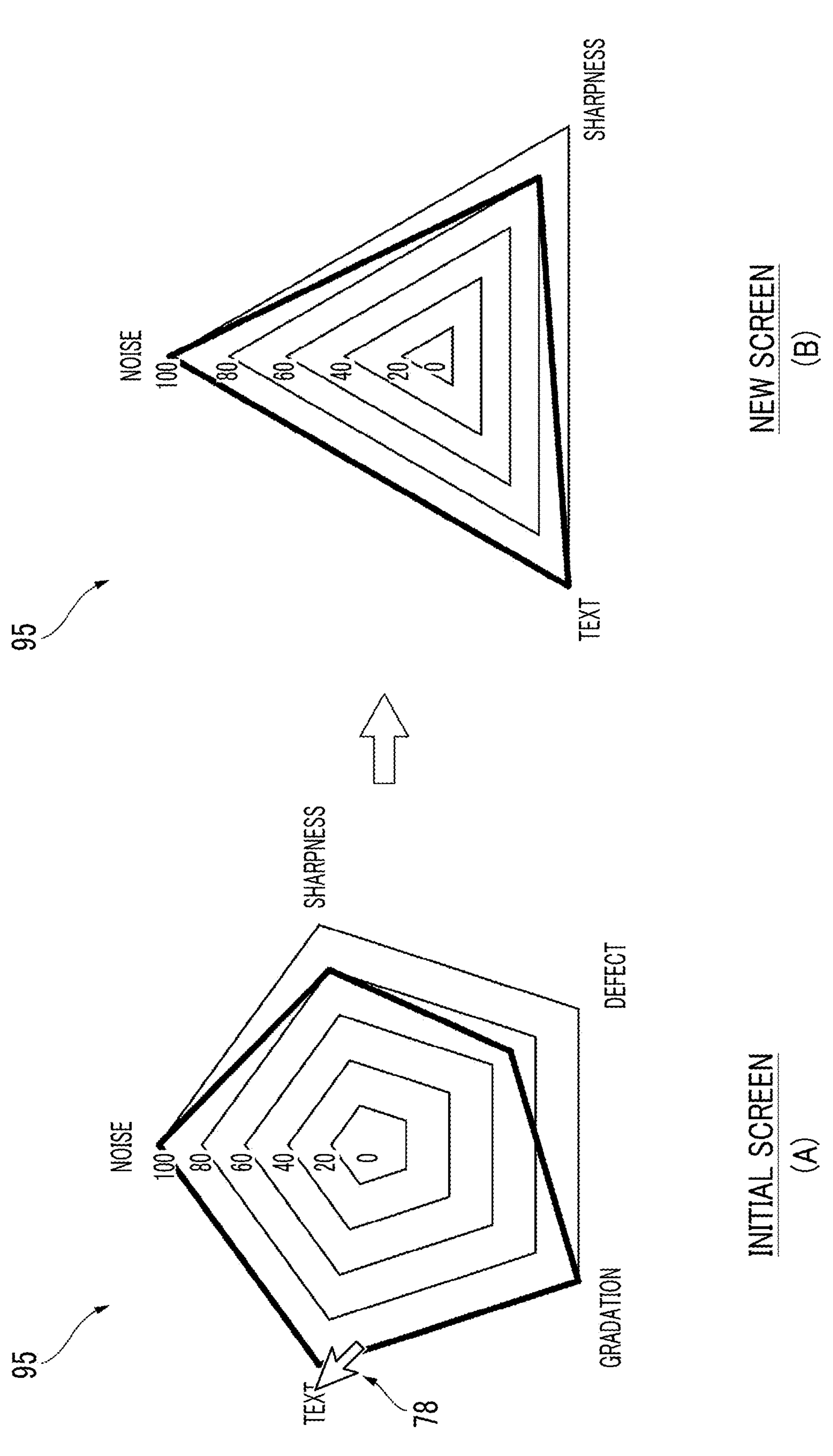

(A) and (B) of FIG. 7 are diagrams illustrating an example of a new screen generated by the CPU;

FIG. 8 is a diagram illustrating a relationship between each diagnostic item and a group to which the diagnostic item belongs;

FIG. 9 is a diagram illustrating still another example of the screen generated by the CPU;

FIG. 10 is a diagram illustrating still yet another example of the screen generated by the CPU;

FIG. 11 is a diagram illustrating an example of a process executed by the CPU of the server apparatus;

FIG. 12 is a diagram illustrating still yet another example of the screen generated by the CPU;

FIGS. 13A and 13B are diagrams illustrating still another example of the screen generated by the CPU of the server apparatus;

(A) and (B) of FIG. 14 are diagrams illustrating screens displayed in a case where the user selects a diagnostic item group;

(A) and (B) of FIG. 15 are diagrams illustrating another display example;

(A) and (B) of FIG. 16 are diagrams illustrating still another display example;

(A) and (B) of FIG. 17 are diagrams illustrating another new screen generated by the CPU of the server apparatus;

(A) and (B) of FIG. 18 are diagrams illustrating another example of the new screen generated by the CPU of the server apparatus; and (A) and (B) of FIG. 19 are diagrams illustrating still another example of the new screen generated by the CPU.

DETAILED DESCRIPTION

Hereinafter, an exemplary embodiment of the present invention will be described with reference to the accompanying drawings.

Figure 1:
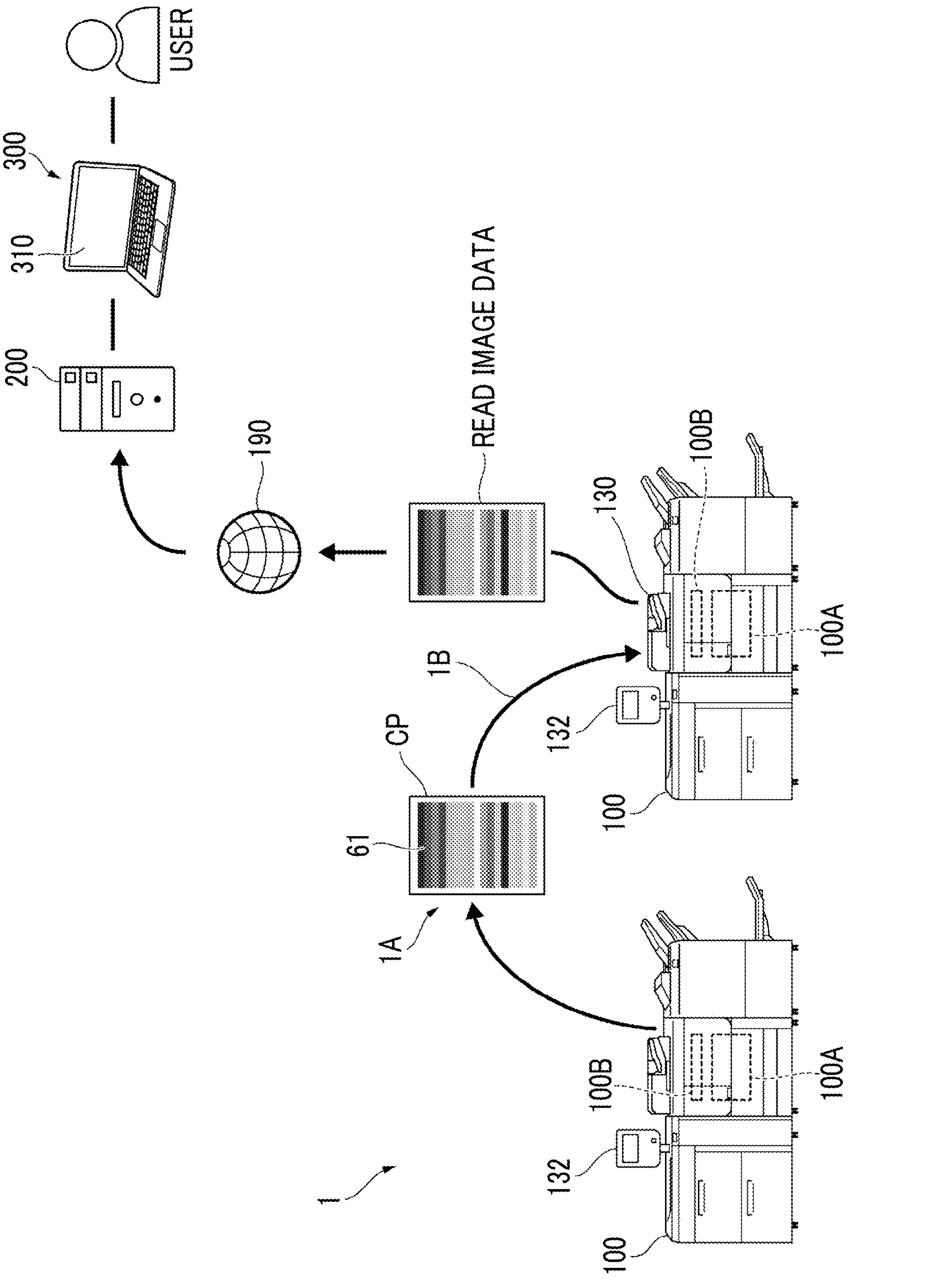
FIG. 1 is a diagram illustrating an example of a diagnosis system.

FIG. 1 is a diagram illustrating an example of a diagnosis system 1.

The diagnosis system 1 according to the present exemplary embodiment is provided with a plurality of image forming apparatuses 100 and a server apparatus 200 that is connected to each of the plurality of image forming apparatuses 100 via a communication line 190. In the present exemplary embodiment, in the server apparatus 200 as an example of an information processing system, diagnosis of each image forming apparatus 100 is performed.

Further, the diagnosis system 1 in the present exemplary embodiment is provided with a user terminal 300 that is connected to the server apparatus 200 and receives an operation from a user.

In FIG. 1, one image forming apparatus 100 among a plurality of image forming apparatuses 100 is displayed.

The user terminal 300 is provided with a display device 310. The user terminal 300 is realized by a computer. Examples of the form of the user terminal 300 include a personal computer (PC), a smartphone, and a tablet terminal.

The image forming apparatus 100 is provided with an image forming unit 100A as an example of an image forming section that forms an image on paper which is an example of a recording medium.

For example, the formation of an image on paper by the image forming unit 100A is performed by an inkjet method or an electrophotographic method. In addition, the formation of an image on paper by the image forming unit 100A is not limited to the inkjet method or the electrophotographic method, but may be performed by other methods.

The image forming apparatus 100 is further provided with an information processing unit 100B. The information processing unit 100B executes various processes executed in the image forming apparatus 100.

Figure 2:
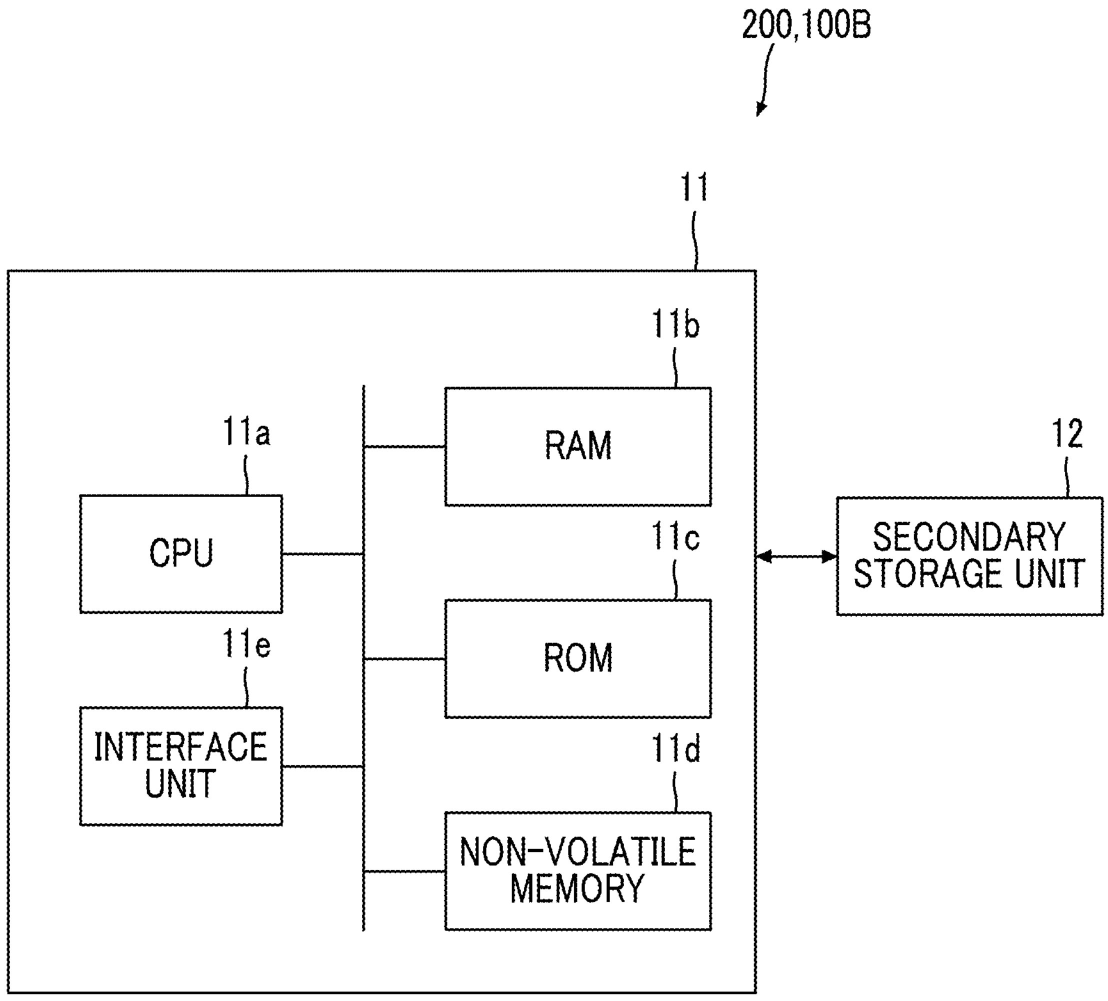
FIG. 2 is a diagram illustrating an example of a hardware configuration of an information processing unit provided in a server apparatus and an image forming apparatus.

FIG. 2 is a diagram illustrating an example of a hardware configuration of the information processing unit 100B provided in the server apparatus 200 and the image forming apparatus 100. The information processing unit 100B provided in the server apparatus 200 and the image forming apparatus 100 is realized by a computer.

Each of the server apparatus 200 and the information processing unit 100B includes an arithmetic processing unit 11 that executes a digital arithmetic process according to a program, and a secondary storage unit 12 that stores information.

The secondary storage unit 12 is realized, for example, by a known information storage device such as a hard disk drive (HDD), a semiconductor memory, or a magnetic tape.

The arithmetic processing unit 11 is provided with a CPU 11*a* as an example of a processor.

In addition, the arithmetic processing unit 11 is provided with a RAM 11*b* used as a work memory or the like of the CPU 11*a* and a ROM 11*c* in which programs or the like executed by the CPU 11*a* are stored.

In addition, the arithmetic processing unit 11 is provided with a non-volatile memory 11*d* that is configured to be rewritable and can hold data even in a case in which power supply is interrupted and an interface unit 11*e* that controls each unit, such as a communication unit, connected to the arithmetic processing unit 11.

The non-volatile memory 11*d* is configured by, for example, an SRAM or a flash memory that is backed up by a battery. The secondary storage unit 12 stores the programs executed by the arithmetic processing unit 11 in addition to files and the like.

In the present exemplary embodiment, the arithmetic processing unit 11 reads the program stored in the ROM 11*c* or the secondary storage unit 12 to perform each process.

The program executed by the CPU 11*a* can be provided to the server apparatus 200 and the information processing unit 100B in a state in which the program is stored in a computer-readable recording medium such as a magnetic recording medium (for example, a magnetic tape or a magnetic disk), an optical recording medium (for example, an optical disk), a magneto-optical recording medium, or a semiconductor memory. Further, the program executed by the CPU 11*a* may be provided to the server apparatus 200 and the information processing unit 100B by a communication unit such as the Internet.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The process executed by the image forming apparatus 100 among the processes described below is executed by the CPU 11*a* as an example of the processor provided in the image forming apparatus 100.

The process executed by the server apparatus 200 among the processes described below is executed by the CPU 11*a* as an example of the processor provided in the server apparatus 200.

Further, the process for diagnosing the image forming apparatus 100 among the processes described below is executed by the server apparatus 200 as an example of the information processing system. The information processing system that executes the process for diagnosing the image forming apparatus 100 may be realized by one apparatus such as one server apparatus 200, or may be realized by a plurality of apparatuses.

Figure 3:
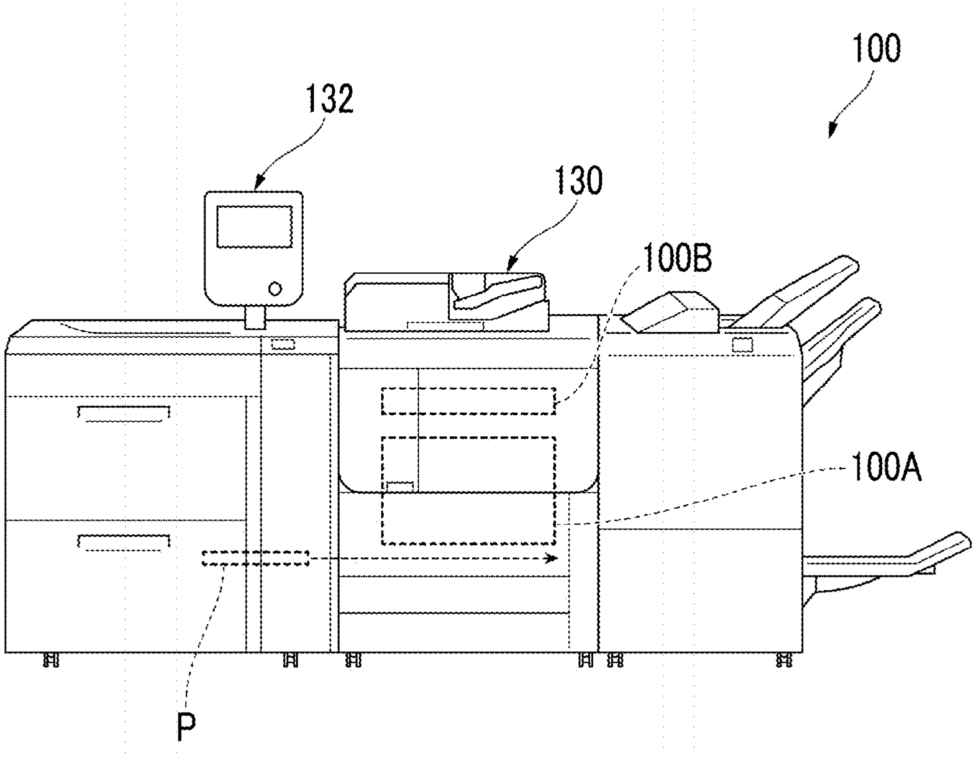
FIG. 3 is a diagram illustrating an image forming apparatus.

FIG. 3 is a diagram illustrating the image forming apparatus 100.

In the present exemplary embodiment, as described above, the image forming apparatus 100 is provided with the image forming unit 100A that forms an image on paper P which is an example of a recording medium.

In the present exemplary embodiment, in a case where the paper P passes through the image forming unit 100A, the paper P passes through the image forming unit 100A in a state where one side of the paper P faces the image forming unit 100A.

Further, the image forming apparatus 100 is provided with an image reading device 130 as an example of an image reading section that reads an image formed on a recording medium such as paper.

Such an image reading device 130 is a so-called scanner having a function of transporting the paper. The image reading device 130 includes a light source that emits light to paper and a light receiving unit such as a CCD, that receives reflected light from the paper. In the present exemplary embodiment, read image data described later is generated based on the reflected light received by the light receiving unit.

A reading position of an image is set in advance in the image reading device 130, and the image reading device 130 reads an image at a portion of paper that is sequentially transported, which is located at the reading position.

The image forming apparatus 100 has an information transmission function of transmitting information to the server apparatus 200 (see FIG. 1).

In the example illustrated in FIG. 3, the image reading device 130 is provided above the image forming apparatus 100. The image reading device 130 sequentially reads paper (not illustrated) set by the user. The paper is not limited to paper on which an image is formed by the image forming apparatus 100, and may be paper on which an image is formed by another image forming apparatus.

An installation form of the image reading device 130 is not limited to the form illustrated in FIG. 3. The image reading device 130 may be provided inside the image forming apparatus 100 and on a transport path of paper P.

In this case, the paper P on which an image is formed by the image forming unit 100A sequentially passes through the image reading device 130, and at the time of passing through the paper P, each image of the paper P is read in order.

In the present exemplary embodiment, the image reading device 130 is provided with a paper reversing mechanism so that the paper can be supplied after the front and back sides have been reversed with respect to the reading position of the image.

Thus, in the present exemplary embodiment, the paper on which an image formed on one side is read can be reversed and supplied to the reading position again. As a result, images on the front and back sides of the paper can be read.

In addition, in reading an image on paper, the paper is placed on a platen (not illustrated) configured by plate-shaped glass or the like so that the paper placed on the platen can be read.

Further, each image forming apparatus 100 is provided with an operation reception unit 132 that receives an operation from the user. The operation reception unit 132 is configured by a so-called touch panel. The operation reception unit 132 displays information for the user and receives an operation performed by the user.

The display of information for the user and the reception of the operation by the user are not limited to being performed by one operation reception unit 132 as in the present exemplary embodiment. The operation reception unit and the information display unit may be provided separately.

In the present exemplary embodiment, in a case in which the image forming apparatus 100 (see FIG. 1) is diagnosed, first, the image forming unit 100A is operated to form a chart image on paper P. Thus, as indicated by the reference sign 1A in FIG. 1, chart paper CP which is the paper on which a chart image being an example of a diagnosis image has been formed is generated.

A chart image 61 is an image used to diagnose the image forming apparatus 100. In the present exemplary embodiment, the chart paper CP which is the paper on which the chart image 61 used for the diagnosis has been formed is generated.

In a case where the chart paper CP is generated, the chart paper CP is installed on the image reading device 130 as indicated by the reference sign 1B in FIG. 1. The image reading device 130 is used to read the chart paper CP on which the chart image 61 is formed.

As a result, read image data obtained by reading the chart paper CP is generated.

In the present exemplary embodiment, the read image data is transmitted to the server apparatus 200 and then is stored in the server apparatus 200. The server apparatus 200 diagnoses the image forming apparatus 100 based on the read image data.

In the present exemplary embodiment, a user who uses the diagnosis system 1 in the present exemplary embodiment, such as a maintainer who maintains the image forming apparatus 100, accesses the server apparatus 200 and refers to the result of the diagnosis by the server apparatus 200.

In each image forming apparatus 100, as described above, the chart paper CP is generated and the chart paper CP is read, and thus the read image data is generated.

Such read image data is transmitted to the server apparatus 200. As described above, in the present exemplary embodiment, the server apparatus 200 diagnoses the image forming apparatus 100.

A diagnosis process executed by the server apparatus 200 will be described.

In the present exemplary embodiment, the CPU 11*a* (see FIG. 2) as an example of the processor provided in the server apparatus 200 diagnoses the image forming apparatus 100 based on the above-described read image data transmitted from the image forming apparatus 100, and then acquires the diagnosis result which is the result of the diagnosis.

More specifically, the CPU 11*a* acquires a diagnosis result for each of a plurality of diagnostic items, which is a diagnosis result for the chart image 61 that is the image formed on the chart paper CP.

In the present exemplary embodiment, a plurality of diagnostic items are predetermined. The CPU 11*a* in the server apparatus 200 analyzes the chart image 61 included in the read image data, and acquires a diagnosis result for each of the plurality of diagnostic items.

More specifically, for example, the CPU 11*a* in the server apparatus 200 acquires the diagnosis result for each of the plurality of diagnostic items based on a difference between the reference value predetermined for each of the plurality of diagnostic items and the value obtained by analyzing the chart image 61.

The CPU 11*a* in the server apparatus 200 acquires a diagnosis result having a worse evaluation as the difference increases.

Then, the CPU 11*a* rearranges the acquired plurality of diagnosis results such that the plurality of acquired diagnosis results are arranged in a predetermined order.

More specifically, in rearranging the plurality of diagnosis results, the CPU 11*a* rearranges a plurality of diagnosis results such that, for example, the plurality of diagnosis results are arranged in an order of a bad evaluation or a good evaluation.

Then, the CPU 11*a* generates a screen in which the plurality of diagnosis results are arranged in a predetermined order.

FIG. 4 is a diagram illustrating an example of a screen 95 generated by the CPU 11*a*.

In this example illustrated in FIG. 4, the screen 95 in which a plurality of diagnosis results are arranged in an order of a poor evaluation is illustrated. In the present exemplary embodiment, the diagnosis result is indicated by a numerical value, and the smaller the numerical value, the worse the evaluation.

In the example illustrated in FIG. 4, a plurality of diagnosis results are arranged such that the diagnosis result having a poorer evaluation is located at an upper portion of the screen 95 and the diagnosis result having a better evaluation is located at a lower portion of the screen 95.

In addition, a plurality of diagnosis results may be arranged such that the diagnosis result having a poorer evaluation is located at the lower portion of the screen 95 and the diagnosis result having a better evaluation is located at the upper portion of the screen 95. In this case, a user can easily specify the diagnosis result having a good evaluation.

In the present exemplary embodiment, information regarding the screen 95 generated by the CPU 11*a* is transmitted from the server apparatus 200 (see FIG. 1) to the user terminal 300, and the screen 95 generated by the CPU

11*a* is displayed on the user terminal 300. As a result, the user grasps the diagnosis result for each of a plurality of diagnostic items.

The present disclosure is not limited to this, and the information regarding the screen 95 may be set to be output to an apparatus having a printing function such as the image forming apparatus 100 (see FIG. 1), and the screen 95 may be set to be printed on a recording medium such as paper.

The "screen 95" is not limited to being displayed on the display device 310, and includes a screen printed on a recording medium such as paper.

In the screen 95 illustrated in FIG. 4, in addition to the diagnosis result, a numerical value (indicated by the reference sign 4A) indicating a rank, a diagnostic item name indicated by the reference sign 4B, and a coping method indicated by the reference sign 4C are displayed in a state of being associated with each diagnosis result. Here, the diagnostic item name can be referred to as information for specifying the diagnostic item.

In the present exemplary embodiment, in a case where the user selects a display location of the coping method on the screen 95 illustrated in FIG. 4, a coping method for improving the diagnosis result associated with the selected coping method is displayed.

In other words, in a case where the user selects the display location of a coping method, a treatment method for this location, such as a repair method for a portion of the image forming apparatus 100 that affects the diagnosis result associated with the selected coping method is displayed.

Here, the diagnosis result having a poor evaluation can be referred to as a diagnosis result reflecting a failure or the like of the image forming apparatus 100, and can be referred to as a diagnosis result having a high priority of treatment.

On the screen 95 illustrated in FIG. 4, a plurality of diagnosis results are arranged in a predetermined order, and the display size of the diagnosis results is decreased in accordance with the order. More specifically, on the screen 95 illustrated in FIG. 4, a plurality of diagnosis results are arranged in an order of a poor evaluation, and the display size of the diagnosis results is decreased in accordance with the order.

In other words, on this screen 95 illustrated in FIG. 4, the diagnosis result having a rank closer to the first rank has a larger display size, and the diagnosis result having a rank closer to the last rank has a smaller display size.

On this screen 95 illustrated in FIG. 4, the numerical value displayed in the leftmost column indicates the rank. The closer this numerical value is to 1, the larger the display size of the diagnosis result. The closer this numerical value is to 8, the smaller the display size of the diagnosis result.

In FIG. 4, not only the diagnosis result but also the numerical value indicating the rank, the diagnostic item name, and the coping method have different display sizes in accordance with the order.

As described above, on this screen 95 illustrated in FIG. 4, the plurality of diagnosis results are arranged in the order of the poor evaluation. Further, on this screen 95, the worse the evaluation, the larger the display size of the diagnosis result.

The present disclosure is not limited to this, and the screen 95 in which the display size of the diagnosis result increases as the order is lowered may be made. On the screen 95 illustrated in FIG. 4, in a case where the display size of the diagnosis result becomes larger as the order is lowered, the user can easily specify the diagnosis result having a good evaluation.

Further, on the screen 95 illustrated in FIG. 4, the colors of the diagnosis results are different in accordance with the order of the diagnosis results.

Specifically, on the screen 95 illustrated in FIG. 4, the color of the diagnosis result having the first rank is red, and the color of the diagnosis result having the second rank is yellow. The color of the diagnosis result having the third or higher rank is black.

Not only the diagnosis result, but also the numerical value indicating the rank, the diagnostic item name, and the coping method are different in color in accordance with the order.

Similar to the diagnosis result, the numerical value, the diagnostic item name, and the coping method with the first rank has a red color. The numerical value, the diagnostic item name, and the coping method with the second rank has a yellow color, and the numerical value, the diagnostic item name, and the coping method with the third or higher rank has a black color.

FIG. 5 is a diagram illustrating another example of the screen 95 generated by the CPU 11*a* of the server apparatus 200.

In the example illustrated in FIG. 5, the diagnosis results for some of the above-described plurality of diagnostic items are displayed.

In the present exemplary embodiment, the user can select a diagnostic item among a plurality of set diagnostic items. In FIG. 5, the diagnosis results for the diagnostic item selected by the user among the plurality of diagnostic items are arranged in a predetermined order.

Figure 6:
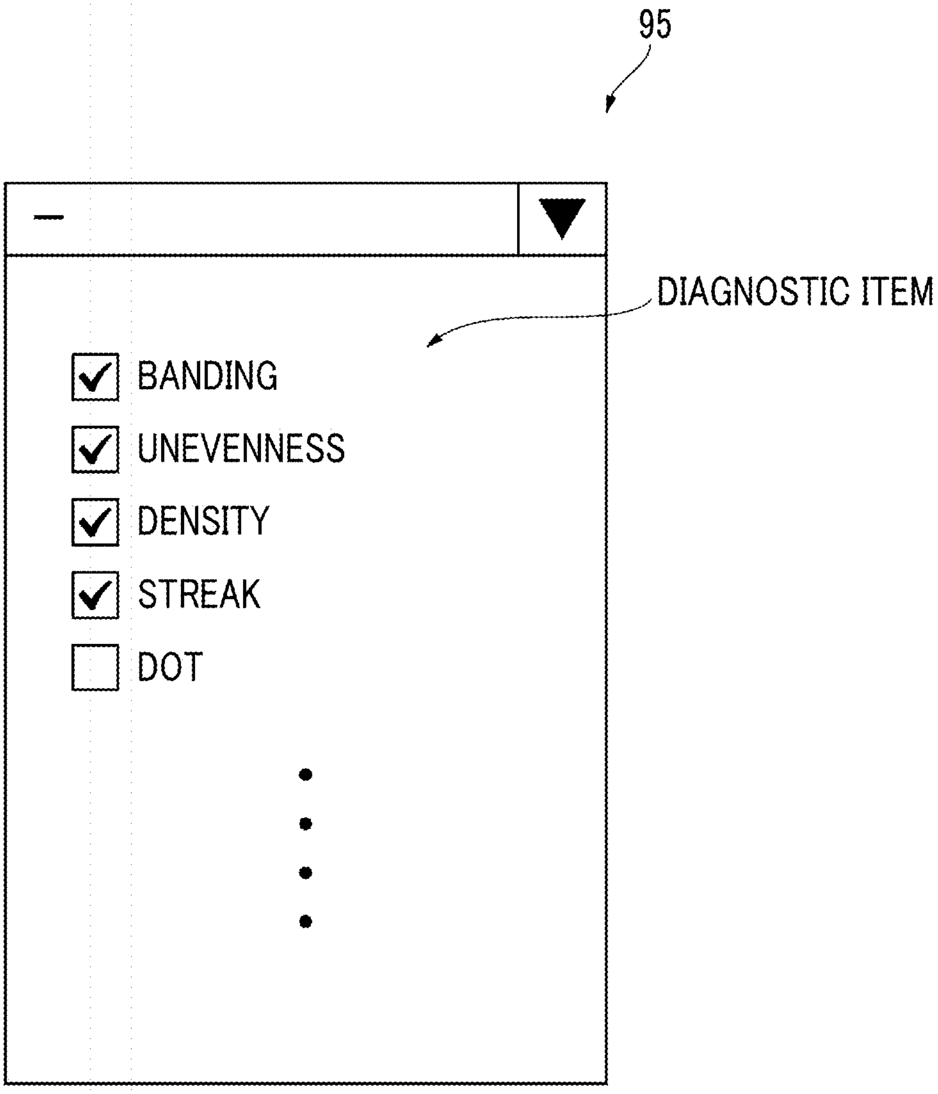
FIG. 6 is a diagram illustrating a screen referred in a case where a user selects a diagnostic item.

FIG. 6 is a diagram illustrating the screen 95 referred in a case where the user selects the diagnostic item.

In the present exemplary embodiment, the screen 95 illustrated in FIG. 6 is displayed on the user terminal 300 (see FIG. 1).

A plurality of diagnostic items are displayed on the screen 95 illustrated in FIG. 6, and the user selects a diagnostic item among the plurality of diagnostic items by performing an operation on the user terminal 300. In this example, the user selects "banding", "unevenness", "density", and "streak".

Information regarding the diagnostic item selected by the user is transmitted from the user terminal 300 to the server apparatus 200.

Accordingly, the CPU 11*a* of the server apparatus 200 specifies the diagnostic item selected by the user (may be referred to as a "selection diagnostic item" below). In the present exemplary embodiment, in a case where the user selects a diagnostic item, the CPU 11*a* of the server apparatus 200 specifies the selection diagnostic item that is the diagnostic item selected by the user.

The CPU 11*a* rearranges the plurality of diagnosis results that have already been acquired, based on the specified selection diagnostic item.

In this rearrangement, the CPU 11*a* rearranges the diagnosis results such that the diagnosis results corresponding to the selection diagnostic items are arranged in a predetermined order. Here, similar to the above description, examples of the predetermined order include an order of a poor evaluation or an order of a good evaluation.

In other words, in this case, the CPU 11*a* does not set the diagnosis result for the diagnostic item other than the selection diagnostic item as a target of the rearrangement, and sets only the diagnosis result for the selection diagnostic item as the target, and then rearranges the diagnosis results.

In other words, in this case, the CPU 11*a* rearranges the diagnosis results by setting, as the target, only the diagnosis results corresponding to the selection diagnostic items among the plurality of diagnosis results that have already been acquired.

Then, the CPU 11*a* generates the screen 95. In generating the screen 95, the CPU 11*a* generates the screen 95 in which the diagnosis results corresponding to the selection diagnostic items are arranged in a predetermined order.

In other words, in generating the screen 95, the CPU 11*a* generates the screen 95 in which the diagnosis results corresponding to the selection diagnostic items, which are included in the plurality of diagnosis results that have already been acquired, are arranged in a predetermined order.

As a result, a new screen 95 illustrated in FIG. 5 is generated.

In the new screen 95 illustrated in FIG. 5, the diagnosis results for each of the above four diagnostic items selected by the user are arranged in a predetermined order. Specifically, on this new screen 95 illustrated in FIG. 5, the diagnosis results for each of the four diagnostic items are arranged in an order of a poor evaluation.

Although the new screen 95 is generated here by rearranging the diagnosis results, the new screen 95 may be generated by another method.

For example, the diagnosis results other than corresponding diagnosis results that are the diagnosis results corresponding to the selection diagnostic items, are deleted from the diagnosis results arranged in a predetermined order, which are obtained by the first rearrangement. The new screen 95 illustrated in FIG. 5 is generated by displaying only the diagnosis results remaining after the deletion.

(A) and (B) of FIG. 7 are diagrams illustrating an example of the new screen 95 generated by the CPU 11*a*. FIG. 8 is a diagram illustrating a relationship between each diagnostic item and a group to which the diagnostic item belongs.

The screen 95 illustrated in (A) of FIG. 7 illustrates a screen 95 firstly generated by the CPU 11*a* (referred to as an "initial screen 95" below), and the screen 95 illustrated in (B) of FIG. 7 illustrates a screen 95 that is newly generated by the CPU 11*a*.

In other words, the screen 95 illustrated in (A) of FIG. 7 illustrates the initial screen 95 obtained by the first rearrangement, and the screen 95 illustrated in (B) of FIG. 7 illustrates a new screen 95 that is generated after the initial screen 95 is generated.

As illustrated in (B) of FIG. 7, in this example as well, on the newly generated screen 95, the diagnosis results for some of the above-described plurality of diagnostic items are displayed.

In the present exemplary embodiment, as illustrated in FIG. 8, information regarding a group to which the diagnostic item belongs is associated with each of the plurality of diagnostic items.

In the present exemplary embodiment, information regarding the diagnostic item and the information regarding the group to which the diagnostic item belongs are associated with each other, and information indicating a relationship between the diagnostic item and the group is generated and registered in advance. The information indicating the relationship between the diagnostic item and the group is stored, for example, in the secondary storage unit 12 (see FIG. 2) of the server apparatus 200.

In the example illustrated in FIG. 8, the diagnostic items "density", "unevenness", and "banding" belong to the group "natural image quality", and the group "natural image quality" is associated with the diagnostic items "density", "unevenness", and "banding".

The diagnostic items "color register" and "line reproduction" belong to the group "text line quality", and the group "text line quality" is associated with the diagnostic items "color register" and "line reproduction".

In addition, the diagnostic items "afterimage", "streak", and "dot" belong to the group "image defective quality", and the group "image defective quality" is associated with the diagnostic items "afterimage", "streak", and "dot".

Here, a process example in a case where the user selects one group from the plurality of groups will be described.

In a case where the user selects a group, the CPU 11*a* rearranges the diagnosis results such that the diagnosis results corresponding to the diagnostic items belonging to the group selected by the user (referred to as a "dependent diagnostic item" below) are arranged in a predetermined order.

In generating the new screen 95, the CPU 11*a* generates the screen 95 in which the diagnosis results corresponding to the dependent diagnostic items are arranged in a predetermined order.

As a result, the new screen 95 illustrated in (B) of FIG. 7 is generated.

In the present exemplary embodiment, in a case where the user selects a group, the screen 95 displayed on the user terminal 300 is switched from the initial screen 95 illustrated in (A) of FIG. 7 to the new screen 95 illustrated in (B) of FIG. 7.

In this example, as indicated by the reference sign 7A in (A) of FIG. 7, a group reception unit 97 for receiving a group selected by the user is provided on the initial screen 95 displayed on the user terminal 300. In the group reception unit 97, a display in a pull-down format is performed, and the user selects a group by performing an operation on the group reception unit 97.

In the example illustrated in (A) of FIG. 7, a case where the group "image defective quality" is selected as an example of the group by the user is illustrated.

In this case, as illustrated in (B) of FIG. 7, the new screen 95 in which the diagnosis results for three diagnostic items of "afterimage", "streak", and "dot" are arranged in a predetermined order is generated.

Here, as described above, the three diagnostic items of "afterimage", "streak", and "dot" belong to the group "image defective quality". In other words, each of the three diagnostic items of "afterimage", "streak", and "dot" is associated with a group to which the name "image defective quality" is associated.

In this case, as described above, a new screen 95 in which the diagnosis results for the three diagnostic items of the "afterimage", the "streak", and the "dot" are arranged in a predetermined order is generated. Here, similar to the above description, examples of the predetermined order include an order of a poor evaluation or an order of a good evaluation.

FIGS. 9 and 10 are diagrams illustrating still another example of the screen 95 generated by the CPU 11*a*.

The screen 95 illustrated in FIG. 9 illustrates the initial screen 95 that is firstly generated by the CPU 11*a*, and the screen 95 illustrated in FIG. 10 illustrates the screen 95 that is newly generated by the CPU 11*a*.

In this example, the diagnosis result for the diagnostic item designated by the user can be changed based on an instruction from the user.

Specifically, on the screen 95 illustrated in FIG. 9, a reception display 83 for receiving a change of the diagnosis result is displayed in a state corresponding to each of the diagnosis results.

The CPU 11*a* changes the diagnosis result for the diagnostic item designated by the user, based on an instruction from the user who performs an operation on the reception display 83. In other words, the CPU 11*a* changes the diagnosis result associated with the reception display 83 operated by the user, based on an instruction from the user who performs the operation on the reception display 83.

The user performs an operation on the reception display 83 to issue an instruction to change the diagnosis result.

In response to this instruction, the CPU 11*a* changes the diagnosis result for the diagnostic item corresponding to the reception display 83 operated by the user, based on the operation amount of the operation performed by the user on the reception display 83.

Here, each reception display 83 is a display in which the user can move a moving object 83A to the right or left.

In a case where the moving object 83A is moved, the CPU 11*a* determines that an instruction has been issued from the user, and that the diagnostic item corresponding to the reception display 83 on which the moving object 83A moved by the user is displayed is the diagnostic item designated by the user.

The CPU 11*a* changes the diagnosis result for the diagnostic item designated by the user, based on the movement amount of the moving object 83A. The CPU 11*a* changes the diagnosis result such that the larger the movement amount of the moving object 83A, the larger the change amount of the diagnosis result.

More specifically, in this example, the CPU 11*a* changes the diagnosis result such that, as the movement amount of the moving object 83A to the left is increased, the evaluation of the diagnosis result becomes worse, and such that, as the movement amount of the moving object 83A to the right is increased, the evaluation of the diagnosis result becomes better.

More specifically, the CPU 11*a* changes the diagnosis result such that, as the movement amount of the moving object 83A to the left is increased, the numerical value of the diagnosis result becomes smaller, and such that, as the movement amount of the moving object 83A to the right is increased, the numerical value of the diagnosis result becomes larger.

Then, the CPU 11*a* rearranges a plurality of diagnosis results including the changed diagnosis result such that the plurality of diagnosis results are arranged in a predetermined order.

In other words, in a case where the diagnosis result is changed by the user, the CPU 11*a* rearranges a plurality of diagnosis results including the changed diagnosis result such that the plurality of diagnosis results are arranged in a predetermined order.

Then, as illustrated in FIG. 10, the CPU 11*a* generates a screen 95 in which the plurality of diagnosis results including the changed diagnosis results are arranged in the predetermined order.

Specifically, for example, in this example, a case where the user performs an operation on the reception display 83 indicated by the reference sign 9A in FIG. 9, and changes the diagnosis result for the diagnostic item "density" that is the diagnostic item designated by the user will be described.

More specifically, in this example, the user moves the moving object 83A on the reception display 83 indicated by the reference sign 9A to the right such that the diagnosis result for the diagnostic item "density" is changed to be improved.

In this case, as illustrated in FIG. 10, on the newly generated screen 95, the rank of the diagnosis result for the "density" is lowered, and thus the diagnosis result for the "density" is displayed at the lower rank.

The screen 95 illustrated in FIG. 9 will be further described.

In the screen 95 illustrated in FIG. 9, the user performs an operation on the reception display 83 to input information regarding the strictness of the diagnosis for the diagnostic item designated by the user (referred to as a "designation diagnostic item" below).

In other words, the user inputs information regarding the strictness of the diagnosis for the diagnostic item corresponding to the reception display 83 operated by the user.

In a case where the operation on the reception display 83 is performed, the CPU 11*a* acquires the information regarding the strictness of the diagnosis. In other words, in this case, the CPU 11*a* acquires information regarding the strictness of the diagnosis for the designation diagnostic item from the user.

More specifically, the CPU 11*a* acquires information indicating that, as the movement amount of the moving object 83A to the left is increased, the strictness of the diagnosis becomes stricter, and acquires information indicating that, as the movement amount of the moving object 83A to the right is increased, the strictness of the diagnosis becomes less strict.

The CPU 11*a* changes the diagnosis result for the designation diagnostic item based on the acquired information regarding the strictness.

Here, the CPU 11*a* changes the diagnosis result such that the stricter the strictness specified by the information regarding the strictness, the worse an evaluation of the diagnosis result for the designation diagnostic item, in changing the diagnosis result for the designation diagnostic item.

Specifically, the CPU 11*a* changes the diagnosis result such that the stricter the strictness specified by the information regarding the strictness, the smaller the numerical value of the diagnosis result corresponding to the designation diagnostic item.

More specifically, the CPU 11*a* changes the diagnosis result such that, the stricter the strictness specified by the information regarding the strictness, the smaller the coefficient used in generating the diagnosis result, and thus the evaluation of the diagnosis result becomes worse.

Further, the CPU 11*a* changes the diagnosis result such that, the less strict the strictness specified by the information regarding the strictness, the larger the coefficient used in generating the diagnosis result, and thus the evaluation of the diagnosis result becomes better.

Although the description has been omitted above, the CPU 11*a* acquires the diagnosis result by using a predetermined prepared generation expression in the case of acquiring the diagnosis result.

This generation expression includes a coefficient to be multiplied by the numerical value assigned to this generation expression. In a case where this coefficient is reduced, the numerical value of the diagnosis result becomes small. In a case where this coefficient is increased, the numerical value of the diagnosis result becomes large.

The CPU 11*a* changes the diagnosis result such that the stricter the strictness specified by the information regarding the strictness, the smaller the coefficient, and thus the smaller the numerical value of the diagnosis result.

Further, the CPU 11*a* changes the diagnosis result such that, the less strict the strictness specified by the information regarding the strictness, the larger the coefficient, and thus the numerical value of the diagnosis result becomes larger.

The CPU 11*a* rearranges a plurality of diagnosis results including the diagnosis result for the changed designation diagnostic item such that the plurality of diagnosis results are arranged in the predetermined order described above.

The CPU 11*a* generates the new screen 95 in which the plurality of diagnosis results including the changed diagnosis results for the designation diagnostic item are arranged in the predetermined order. Thus, for example, the screen 95 illustrated in FIG. 10 is generated.

In this screen 95 illustrated in FIG. 10, the numerical value of the diagnosis result for the diagnostic item "density" is a larger value, and the order of the diagnosis result for the diagnostic item "density" is lowered.

FIG. 11 is a diagram illustrating an example of a process executed by the CPU 11*a* of the server apparatus 200.

Also in this process example, first, the CPU 11*a* acquires the diagnosis result for each of the plurality of diagnostic items, which is the diagnosis result that is the result of diagnosing a chart image 61.

Specifically, in this example illustrated in FIG. 11, 8 items of "granular", "mottle", "resolution", "contrast", "periodic unevenness", "sudden streak", "tone jump", and "text" serve as the diagnostic items, and the CPU 11*a* acquires the diagnosis result indicated by the reference sign 11A, for each of the plurality of diagnostic items.

Here, the diagnosis result is represented by a numerical value, and the smaller the numerical value, the worse the diagnosis result.

More specifically, as indicated by the reference sign 11B in FIG. 11, the CPU 11*a* first acquires the diagnosis result for each color of cyan, magenta, yellow, and black. The CPU 11*a* acquires each of the diagnosis results indicated by the reference sign 11A, based on the four diagnosis results acquired for each of the colors.

Although not described above, the image forming unit 100A of the image forming apparatus 100 (see FIG. 1) to be diagnosed is provided with four image forming units that form images of different colors. More specifically, the image forming unit 100A is provided with four image forming units that form images of cyan, magenta, yellow, and black, respectively.

The chart image 61 (see FIG. 1) formed on chart paper CP includes an image formed by the four image forming units. The CPU 11*a* analyzes the chart image 61 and acquires the diagnosis result, first, for each color of cyan, magenta, yellow, and black.

The CPU 11*a* acquires the diagnosis results for each of the plurality of diagnostic items indicated by the reference sign 11A in FIG. 11, based on the four diagnosis results acquired for each of the colors.

Here, the CPU 11*a* acquires, as the diagnosis result indicated by the reference sign 11A, an average value of the diagnosis results acquired for each color of cyan, magenta, yellow, and black.

Then, in this example, the CPU 11*a* generates evaluation information for each diagnostic item group that is a group to which each of the diagnostic items indicated by the reference sign 11C belongs, based on the diagnosis result for each diagnostic item belonging to the diagnostic item group. The evaluation information is information regarding an evaluation for the diagnostic item group.

Specifically, the CPU 11*a* obtains an average value of diagnosis results for the diagnostic items belonging to the diagnostic item group for each diagnostic item group, and uses this average value as the evaluation information.

In the example illustrated in FIG. 11, each of "noise", "sharpness", "defect", "gradation", and "text" indicated by the reference sign 11D serves as the diagnostic item group.

Further, in the example illustrated in FIG. 11, the numerical value indicated by the reference sign 11E, which is displayed on the right side of the diagnostic item groups serves as the evaluation information.

In this example, the diagnostic items "granular" and "mottle" belong to the diagnostic item group "noise".

In this case, the CPU 11*a* generates evaluation information "100" regarding the diagnostic item group "noise", based on the diagnosis result "100" for the diagnostic item "granular", and "100" that is the diagnosis result for the diagnostic item "mottle".

Further, in this example, the diagnostic items "resolution" and "contrast" belong to the diagnostic item group "sharpness".

In this case, the CPU 11*a* generates evaluation information "80" regarding the diagnostic item group "sharpness", based on the diagnosis result "90" for the diagnostic item "resolution", and "70" that is the diagnosis result for the diagnostic item "contrast".

Further, in this example, the diagnostic items "periodic unevenness" and "sudden streak" belong to the diagnostic item group "defect".

In this case, the CPU 11*a* generates evaluation information "70" regarding the diagnostic item group "defect", based on the diagnosis result "50" for the diagnostic item "periodic unevenness", and "90" that is the diagnosis result for the diagnostic item "sudden streak".

Further, in this example, the diagnostic item "tone jump" belongs to the diagnostic item group "gradation".

In this case, the CPU 11*a* generates the evaluation information "100" for the diagnostic item group "gradation" based on the diagnosis result "100" for the diagnostic item "tone jump".

Further, in this example, the diagnostic item "text" belongs to the diagnostic item group "text".

In this case, the CPU 11*a* generates the evaluation information "100" for the diagnostic item group "text" based on the diagnosis result "100" for the diagnostic item "text".

Then, the CPU 11*a* generates a screen 95 on which each of the diagnostic item groups and the evaluation information corresponding to the diagnostic item group are displayed.

FIG. 12 is a diagram illustrating an example of the screen 95 generated by the CPU 11*a*. On this screen 95, five diagnostic item groups of "noise", "sharpness", "defect", "gradation", and "text", which are diagnostic item groups, are displayed, and further, the evaluation information corresponding to the five diagnostic item groups is displayed. Here, the evaluation information is represented by the positions of the vertices of the pentagon indicated by the reference sign 12A.

On this screen 95, the diagnostic item group and the evaluation information are displayed in a state of being associated with each other.

In this example, in generating the screen 95, the CPU 11*a* generates the screen 95 in which each of the diagnostic item groups and the evaluation information are displayed on a graph, as illustrated in FIG. 12.

More specifically, in this example, in generating the screen 95, the CPU 11*a* generates the screen 95 in which each of the diagnostic item groups and the evaluation information are displayed on a radar chart which is an example of a graph.

Here, the "graph" refers to a graph showing the relationship between the diagnostic item group and the evaluation information.

Further, the "radar chart" refers to a chart in which the relationship between the diagnostic item group and the evaluation information is displayed on a polygon. In the present exemplary embodiment, the diagnostic item group is associated with each of the vertices of the polygon, and evaluation information of each diagnostic item is displayed on a line connecting the vertex of the polygon and the center of the polygon.

FIGS. 13A and 13B are diagrams illustrating still another example of the screen 95 generated by the CPU 11*a* of the server apparatus 200.

In the above description, a case where the diagnostic item group and the evaluation information are displayed on the radar chart has been described as an example, but the graph is not limited to the radar chart.

As illustrated in FIG. 13A, the screen 95 in which each of the diagnostic item groups and the evaluation information are displayed in a bar graph may be generated.

Further, as illustrated in FIG. 13B, for example, the screen 95 in which each of the diagnostic item groups and the evaluation information are displayed in a list format may be generated.

(A) and (B) of FIG. 14 are diagrams illustrating screens 95 displayed in a case where the user selects the diagnostic item group.

The screen 95 illustrated in (A) of FIG. 14 illustrates the initial screen 95 which is the screen 95 illustrated in FIG. 12 and is the screen 95 first generated by the CPU 11*a*. The initial screen 95 illustrated in (A) of FIG. 14 illustrates a screen that has already been generated and is displayed on the user terminal 300.

In this process example illustrated in FIG. 14, it is assumed that the user selects the diagnostic item group from the diagnostic item groups included in the initial screen 95 illustrated in (A) of FIG. 14.

Specifically, in this example, it is assumed that the user moves a cursor 78 to a display location of the diagnostic item group "defect" and selects the diagnostic item group "defect" from a plurality of diagnostic item groups.

In this case, the CPU 11*a* generates the new screen 95 illustrated in (B) of FIG. 14, in which each of the diagnostic items belonging to the diagnostic item group selected by the user and the diagnosis result corresponding to this diagnostic item are additionally displayed on the initial screen 95.

Specifically, in this example, the CPU 11*a* generates the new screen 95 on which "periodic unevenness" and "sudden streak" which are diagnostic items belonging to the diagnostic item group "defect" selected by the user and the diagnosis result corresponding to each of "periodic unevenness" and "sudden streak" are additionally displayed.

In this example, the diagnostic items and the diagnosis results additionally displayed are displayed on an additional radar chart 79 (see (B) of FIG. 14) that is a radar chart additionally displayed on the basic initial radar chart (see (A) of FIG. 14).

In a case where the user selects any of the diagnostic item groups, the CPU 11*a* generates the new screen 95 on which each of the diagnostic items belonging to the diagnostic item group selected by the user and the diagnosis result corresponding to the diagnostic item are additionally displayed on the radar chart that has been displayed so far.

Here, "additionally displayed on the radar chart that has been displayed so far" means not that the diagnostic item and the diagnosis result are displayed inside an outer peripheral edge 74 (see (A) of FIG. 14) of the initial radar chart, but that the diagnostic item and the diagnosis result are additionally displayed on the initial screen 95 on which the radar chart is displayed.

In addition, the CPU 11*a* may generate the new screen 95 on which each of the diagnostic items belonging to the diagnostic item group selected by the user and the diagnosis result corresponding to the diagnostic item are displayed.

Specifically, in this example, the CPU 11*a* generates the new screen 95 on which "periodic unevenness" and "sudden streak" which are diagnostic items belonging to the diagnostic item group "defect" selected by the user and the diagnosis result corresponding to each of "periodic unevenness" and "sudden streak" are displayed.

(B) of FIG. 14 illustrates a case where each of the diagnostic items and the diagnosis result corresponding to the diagnostic item are additionally displayed on the initial screen, but the present disclosure is not limited to this. After the diagnostic item group is selected, the screen may be changed from the initial screen to another screen. Information regarding the diagnostic item group may not be displayed on the other screen, and but each of the diagnostic items belonging to the selected diagnostic item group and the diagnosis result corresponding to the diagnostic item group may be displayed.

In the example illustrated in FIG. 14, for example, as illustrated in (A) of FIG. 14, in a case where the user moves the cursor 78 to the diagnostic item group and mouse-overs the diagnostic item group, the CPU 11*a* generates the new screen 95 illustrated in (B) of FIG. 14.

The newly generated screen 95 is transmitted to the user terminal 300 (see FIG. 1), and the screen 95 is displayed on the user terminal 300. Thus, the screen 95 illustrated in (B) of FIG. 14 is displayed on the user terminal 300.

In this process example, in a case where the diagnostic item group is selected by the user, detailed information regarding the diagnostic item group is displayed.

Specifically, as detailed information, the diagnostic item belonging to this diagnostic item group and the diagnosis result corresponding to this diagnostic item are displayed.

Although not illustrated, in a case where an evaluation item included in the newly generated screen 95 illustrated in (B) of FIG. 14 is selected, four diagnosis results acquired for each of the above colors may be additionally displayed.

(A) and (B) of FIGS. 15 and (A) and (B) of FIG. 16 are diagrams illustrating another display example.

(A) and (B) of FIG. 15 illustrate display examples in a case where the diagnostic item group and the evaluation information are displayed by a bar graph and the diagnostic item group is selected by the user.

In a case where the initial screen 95 illustrated in (A) of FIG. 15 is displayed, for example, in a case where the user selects the diagnostic item group indicated by the reference sign 15E, as illustrated in (B) of FIG. 15, the new screen 95 on which a bar graph representing the diagnostic item belonging to this diagnostic item group and the diagnosis result corresponding to the diagnostic item is displayed is generated.

In this new screen 95 illustrated in (B) of FIG. 15, the bar graph representing the evaluation information corresponding to the diagnostic item group selected by the user is deleted, and a bar graph representing the diagnosis result corresponding to the diagnostic item is displayed at a location in which the deleted bar graph has been displayed.

The case where the bar graph representing the evaluation information is deleted and the bar graph representing the diagnosis result corresponding to the diagnostic item is displayed has been described here, but the display form is not limited to this.

While maintaining the state in which the bar graph representing the evaluation information is displayed, for example, the bar graph representing the diagnosis result corresponding to the diagnostic item may be displayed inside the display area of the bar graph.

In addition, for example, a bar graph representing the diagnosis result corresponding to the diagnostic item may be displayed on an upper side of a display area of the bar graph while maintaining a state in which the bar graph representing the evaluation information is displayed.

(A) and (B) of FIG. 16 illustrate display examples in a case where the diagnostic item group and the evaluation information are displayed in a list format, and the user selects the diagnostic item group.

In this example, in a state where the initial screen 95 illustrated in (A) of FIG. 16 is displayed, in a case where the user moves the cursor 78 to, for example, a display location of the diagnostic item group indicated by the reference sign 16E, and selects the diagnostic item group, the new screen 95 illustrated in (B) of FIG. 16 is generated.

In this new screen 95 illustrated in (B) of FIG. 16, the diagnostic item belonging to this diagnostic item group and the diagnosis result corresponding to this diagnostic item are displayed at a location in which the evaluation information corresponding to the diagnostic item group selected by the user is displayed.

In the example illustrated in FIG. 16, the case where, in a case where the user selects the diagnostic item group, the new screen 95 on which the diagnostic items belonging to the diagnostic item group and the diagnosis results corresponding to the diagnostic items are displayed is generated will be described.

The present disclosure is not limited to this. In a case where the user moves the cursor 78 to the display location of the evaluation information and selects the evaluation information in the case where the screen in (A) of FIG. 16 is displayed, a new screen 95 on which the diagnostic items belonging to the diagnostic item group corresponding to this evaluation information and the diagnosis results corresponding to the diagnostic items are displayed may be generated.

Further, in the example illustrated in FIG. 16, as illustrated in (B) of FIG. 16, the case where the diagnostic item belonging to the diagnostic item group and the diagnosis result corresponding to the diagnostic item are displayed in a location in which the evaluation information has been displayed has been described.

The display form is not limited to this. The diagnostic item and the diagnosis result corresponding to the diagnostic item may be displayed in a location different from the display location of the evaluation information, such as the right side of the display location of the evaluation information.

(A) and (B) of FIG. 17 are diagrams illustrating another new screen 95 generated by the CPU 11*a* of the server apparatus 200.

(A) of FIG. 17 illustrates the initial screen 95 generated first by the CPU 11*a*. (B) of FIG. 17 illustrates a new screen 95 generated by the CPU 11*a*.

In the present exemplary embodiment, the evaluation information may be changed as described later.

In a case where the evaluation information is changed, the CPU 11*a* generates the new screen 95 on which each of the diagnostic item groups and the evaluation information after the change are displayed, as illustrated in (B) of FIG. 17.

Specifically, the example illustrated in FIG. 17 illustrates a case where the evaluation information for the diagnostic item group "text" illustrated in (A) of FIG. 17 is changed. In this case, the CPU 11*a* generates the new screen 95 on which each of the diagnostic item groups and the evaluation information after the change are displayed, as illustrated in (B) of FIG. 17.

More specifically, the example illustrated in (A) and (B) of FIG. 17 illustrates a case where the evaluation information for the diagnostic item group "text" illustrated in (A) of FIG. 17 is changed from "100" to "80".

In this case, as illustrated in (B) of FIG. 17, the CPU 11*a* generates the new screen 95 on which each of the diagnostic item groups and the evaluation information after the change are displayed. On this new screen 95, the evaluation information regarding the diagnostic item group "text" is "80".

In the example illustrated in (A) and (B) of FIG. 17, only the evaluation information for the diagnostic item group "text" is changed. On the new screen 95 illustrated in (B) of FIG. 17, the evaluation information regarding the diagnostic item group "text" is changed, and the evaluation information regarding the diagnostic item group other than "text" is not changed.

In the present exemplary embodiment, the CPU 11*a* of the server apparatus 200 generates the evaluation information in accordance with predetermined generation conditions, in generating evaluation information.

Examples of the generation condition include a generation condition in which the average value of the diagnosis results obtained for each of the dependent diagnostic items that are diagnostic items belonging to the diagnostic item group is used as the evaluation information.

In this case, the CPU 11*a* uses the average value of the diagnosis results obtained for each of the dependent diagnostic items as the evaluation information for the diagnostic item group.

Further, in the present exemplary embodiment, the user can input information regarding an item to be emphasized. Further, in the present exemplary embodiment, the generation condition used in generating the evaluation information can be changed.

In the present exemplary embodiment, in a case where the item to be emphasized is input, the CPU 11*a* of the server apparatus 200 changes the generation condition and generates new evaluation information by using the changed generation condition. As a result, in this case, the evaluation information is changed.

In a case where the generation condition used for generating the evaluation information is changed to a new generation condition, the CPU 11*a* newly generates the evaluation information for the diagnostic item group by using the new generation condition. Thus, the evaluation information is changed.

In this case, as described above, the CPU 11*a* of the server apparatus 200 generates a new screen 95 on which each of the diagnostic item groups and the newly generated evaluation information are displayed. As a result, the new screen 95 illustrated in (B) of FIG. 17 is generated.

Specifically, in the present exemplary embodiment, the user can use the user terminal 300 (see FIG. 1) to input, for example, any one of "emphasis on natural image quality", "emphasis on text line quality", and "emphasis on image defect" as the item to be emphasized.

In a case where information regarding any of the above items is input, the CPU 11*a* changes the generation condition set in advance for each diagnostic item group, based on the information regarding this item, which is input by the user.

The CPU 11*a* generates new evaluation information for the diagnostic item group by using the changed generation conditions. As a result, as described above, the evaluation information is changed.

(A) of FIG. 17 illustrates the case where the user inputs the item "emphasis on text line quality" as the item to be emphasized, as indicated by the reference sign 17E.

In this case, the CPU 11*a* of the server apparatus 200 changes the generation condition prepared in advance for the diagnostic item group "text" which is the diagnostic item group associated in advance with this item of "emphasis on text line quality".

The CPU 11*a* generates new evaluation information for the diagnostic item group "text" by using the changed generation condition. Accordingly, in this example, the CPU 11*a* generates new evaluation information of "80" for the diagnostic item group "text".

In the present exemplary embodiment, the diagnostic item group is associated with each of the items to be emphasized.

In the present exemplary embodiment, in a case where the item to be emphasized is input, the CPU 11*a* of the server apparatus 200 changes the generation condition associated with the diagnostic item group associated with the item to be emphasized.

Specifically, the CPU 11*a* changes the generation condition so that the coefficient included in the generation condition becomes small. The generation condition in the present exemplary embodiment is configured by a calculation expression including a coefficient to be multiplied by the above-described average value of the diagnosis result of the diagnostic item. Before the change of the generation condition, the coefficient included in this calculation expression is "1".

In the present exemplary embodiment, as described above, the average value of the diagnosis results of the diagnostic items is used as the evaluation information. However, in a normal case, the coefficient is 1, and the average value itself of the diagnosis results of the diagnostic items is generated as the evaluation information.

On the other hand, in a case where the generation condition is changed so that the coefficient included in the generation condition becomes small, the coefficient having a value smaller than 1 is multiplied by the above average value. In a case where the generation condition is changed, the value of the newly generated evaluation information is reduced.

Here, the item to be emphasized indicate an item that the user wants the evaluation to be performed strictly. In the present exemplary embodiment, in a case where the user inputs information regarding any of the items as described above, as a result, the coefficient is reduced. Thus, the value of the evaluation information is reduced, and the evaluation is output in a stricter form.

(A) and (B) of FIG. 18 are diagrams illustrating another example of the new screen 95 generated by the CPU 11*a* of the server apparatus 200.

(A) of FIG. 18 illustrates the initial screen 95 before the new screen 95 is generated, and (B) of FIG. 18 illustrates the new screen 95.

In this example, the user selects the diagnostic item group from the diagnostic item groups included in the initial screen 95 that is the initial screen 95 generated by the CPU 11*a* of the server apparatus 200 and is displayed on the user terminal 300. Specifically, the user selects the diagnostic item group by performing an operation on the user terminal 300.

In this process example, as illustrated in (A) of FIG. 18, the user moves the cursor 78 to a display location of the diagnostic item group "text", and selects the diagnostic item group "text" from a plurality of diagnostic item groups.

In this case, as illustrated in (B) of FIG. 18, the CPU 11*a* generates a new screen 95 on which the diagnostic item group "text" is hidden and the evaluation information corresponding to the diagnostic item group "text" is hidden.

In this process example, in a case where the CPU 11*a* selects the diagnostic item group as illustrated in (A) of FIG. 18, the CPU 11*a* generates the new screen 95 on which the diagnostic item group selected by the user (referred to as a "selection diagnostic item group" below) is hidden and the evaluation information corresponding to this selection diagnostic item group is hidden, as illustrated in (B) of FIG. 18.

In FIG. 18, the case where the selection diagnostic item group and the evaluation information corresponding to the selection diagnostic item group are hidden has been described as an example. The present disclosure is not limited to this. The selection diagnostic item group and the evaluation information corresponding to this selection diagnostic item group may be made inconspicuous by reducing the display density of the selection diagnostic item group and the evaluation information corresponding to this selection diagnostic item group.

In addition, in a case where the user selects the diagnostic item group from the diagnostic item group displayed on the initial screen 95 first generated, the CPU 11*a* may generate the new screen 95 on which the selection diagnostic item group that is the diagnostic item group selected by the user is displayed, and other diagnostic item groups are hidden.

Specifically, in this case, the CPU 11*a* may generate the new screen 95 on which the non-selection diagnostic item group that is the diagnostic item group other than the selection diagnostic item group is hidden, and the evaluation information corresponding to this non-selection diagnostic item group is hidden.

(A) and (B) of FIG. 19 are diagrams illustrating still another example of the new screen 95 generated by the CPU 11*a*. Similar to the above description, (A) of FIG. 19 illustrates the initial screen 95 before the new screen 95 is generated, and (B) of FIG. 19 illustrates the new screen 95.

This example illustrated in FIG. 19 illustrates a case where the user selects three diagnostic item groups of "text", "noise", and "sharpness" from the diagnostic item groups displayed in (A) of FIG. 19.

In this case, as illustrated in (B) of FIG. 19, the CPU 11*a* of the server apparatus 200 generates the new screen 95 on which the non-selection diagnostic item groups "defect" and "gradation" that are the diagnostic item groups other than "text", "noise", and "sharpness" are hidden, and the evaluation information corresponding to the non-selection diagnostic item group is hidden.

Similar to the above description, the non-selection diagnostic item group and the evaluation information corresponding to this non-selection diagnostic item group may be made inconspicuous by reducing the display density of the non-selection diagnostic item group and the evaluation information corresponding to this non-selection diagnostic item group.

SUPPLEMENTARY NOTES (((1)))

An information processing system comprising:

a processor configured to:

acquire a diagnosis result for each of a plurality of diagnostic items, the diagnosis result being a result of diagnosing an image formed on a recording medium;

rearrange the acquired plurality of diagnosis results such that the plurality of diagnosis results are arranged in a predetermined order; and generate a screen in which the plurality of diagnosis results are arranged in the predetermined order.

(((2)))

The information processing system according to (((1))), wherein the processor is configured to:

rearrange the plurality of diagnosis results such that the plurality of diagnosis results are arranged in an order of a poor evaluation or a good evaluation, in rearranging the plurality of diagnosis results.

(((3)))

The information processing system according to (((1))) or (((2))), wherein the processor is configured to:

generate the screen in which the plurality of diagnosis results are arranged in the predetermined order and a display size of each of the diagnosis results is increased or decreased in accordance with the order, in generating the screen.

(((4)))

The information processing system according to (((3))), wherein the processor is configured to:

generate the screen in which the diagnosis result having a rank closer to a first rank has a larger display size, and the diagnosis result having a rank closer to a last rank has a smaller display size, in generating the screen.

(((5)))

The information processing system according to (((1))), wherein the processor is configured to:

rearrange the plurality of diagnosis results such that the plurality of diagnosis results are arranged in an order of a poor evaluation, in rearranging the plurality of diagnosis results; and generate the screen in which the plurality of diagnosis results are arranged in the order of the poor evaluation and the diagnosis result having a poorer evaluation has a larger display size, in generating the screen.

(((6)))

The information processing system according to (((1))), wherein the processor is configured to:

rearrange the plurality of diagnosis results such that the plurality of diagnosis results are arranged in an order of a poor evaluation, in rearranging the plurality of diagnosis results; and generate the screen in which the diagnosis result having a poorer evaluation is located at an upper portion of the screen and the diagnosis result having a better evaluation is located at a lower portion of the screen, in generating the screen.

(((7)))

The information processing system according to any one of (((1))) to (((6))), wherein the processor is configured to:

generate the screen in which the plurality of diagnosis results are arranged in the predetermined order and a color of each of the diagnosis results is different in accordance with the order, in generating the screen.

(((8)))

The information processing system according to any one of (((1))) to (((7))), wherein the processor is configured to:

specify a selection diagnostic item that is the diagnostic item selected by a user among the plurality of diagnostic items;

rearrange the diagnosis result corresponding to the selection diagnostic item such that the diagnosis result is arranged in the predetermined order, in rearranging the plurality of diagnosis results; and generate the screen in which the diagnosis result corresponding to the selection diagnostic item is arranged in the predetermined order, in generating the screen.

(((9)))

The information processing system according to any one of (((1))) to (((7))), wherein information regarding a group to which the diagnostic item belongs is associated with each of the plurality of diagnostic items, and the processor is configured to:

rearrange the diagnosis result corresponding to a dependent diagnostic item that is the diagnostic item belonging to a group selected by a user such that the diagnosis result is arranged in the predetermined order, in rearranging the plurality of diagnosis results; and generate the screen in which the diagnosis result corresponding to the dependent diagnostic item is arranged in the predetermined order, in generating the screen.

(((10)))

The information processing system according to (((1))), wherein the processor is configured to:

change the diagnosis result for the diagnostic item designated by a user based on an instruction from the user;

in a case where the diagnosis result is changed by the user, rearrange a plurality of diagnosis results including the changed diagnosis result such that the plurality of diagnosis results are arranged in the predetermined order; and generate the screen in which the plurality of diagnosis results including the changed diagnosis result are arranged in the predetermined order.

(((11)))

The information processing system according to (((1))), wherein the processor is configured to:

acquire information regarding strictness of diagnosis for a designation diagnostic item that is the diagnostic item designated by a user, from the user;

change the diagnosis result for the designation diagnostic item based on the acquired information regarding the strictness;

rearrange a plurality of diagnosis results including the changed diagnosis result for the designation diagnostic item such that the plurality of diagnosis results are arranged in the predetermined order; and generate the screen in which the plurality of diagnosis results including the changed diagnosis result for the designation diagnostic item are arranged in the predetermined order.

(((12)))

The information processing system according to (((11))), wherein the processor is configured to:

change the diagnosis result such that the stricter the strictness specified by the information regarding the strictness, the worse an evaluation of the diagnosis result for the designation diagnostic item, in changing the diagnosis result for the designation diagnostic item.

(((13)))

A program causing a computer to realize:

a function of acquiring a diagnosis result for each of a plurality of diagnostic items, the diagnosis result being a result of diagnosing an image formed on a recording medium;

a function of rearranging the acquired plurality of diagnosis results such that the plurality of diagnosis results are arranged in a predetermined order; and a function of generating a screen in which the plurality of diagnosis results are arranged in the predetermined order.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing system comprising:

a scanner configured to scan a chart image formed on a recording medium and generate read image data;

a processor configured to:

acquire the read image data from the scanner;

generate a diagnosis result for each of a plurality of diagnostic items based on analysis of the read image data and a difference between the read image data and a predetermined reference value corresponding to each of the plurality of diagnostic items;

acquire the diagnosis result for each of the plurality of diagnostic items, the diagnosis result being a result of diagnosing an image formed on a recording medium;

rearrange the acquired plurality of diagnosis results such that the plurality of diagnosis results are arranged in a predetermined order;

generate a screen in which the plurality of diagnosis results are arranged in the predetermined order;

acquire information regarding strictness of diagnosis for a designation diagnostic item that is the diagnostic item designated by a user, from the user;

change the diagnosis result for the designation diagnostic item based on the acquired information regarding the strictness;

rearrange a plurality of diagnosis results including the changed diagnosis result for the designation diagnostic item such that the plurality of diagnosis results are arranged in the predetermined order; and generate the screen in which the plurality of diagnosis results including the changed diagnosis result for the designation diagnostic item are arranged in the predetermined order.

2. The information processing system according to claim 1, wherein the processor is configured to:

rearrange the plurality of diagnosis results such that the plurality of diagnosis results are arranged in an order of a poor evaluation or a good evaluation, in rearranging the plurality of diagnosis results.

3. The information processing system according to claim 1, wherein the processor is configured to:

generate the screen in which the plurality of diagnosis results are arranged in the predetermined order and a display size of each of the diagnosis results is increased or decreased in accordance with the order, in generating the screen.

4. The information processing system according to claim 3, wherein the processor is configured to:

generate the screen in which the diagnosis result having a rank closer to a first rank has a larger display size, and the diagnosis result having a rank closer to a last rank has a smaller display size, in generating the screen.

5. The information processing system according to claim 1, wherein the processor is configured to:

rearrange the plurality of diagnosis results such that the plurality of diagnosis results are arranged in an order of a poor evaluation, in rearranging the plurality of diagnosis results; and generate the screen in which the plurality of diagnosis results are arranged in the order of the poor evaluation and the diagnosis result having a poorer evaluation has a larger display size, in generating the screen.

6. The information processing system according to claim 1, wherein the processor is configured to:

rearrange the plurality of diagnosis results such that the plurality of diagnosis results are arranged in an order of a poor evaluation, in rearranging the plurality of diagnosis results; and generate the screen in which the diagnosis result having a poorer evaluation is located at an upper portion of the screen and the diagnosis result having a better evaluation is located at a lower portion of the screen, in generating the screen.

7. The information processing system according to of claim 1, wherein the processor is configured to:

generate the screen in which the plurality of diagnosis results are arranged in the predetermined order and a color of each of the diagnosis results is different in accordance with the order, in generating the screen.

8. The information processing system according to claim 1, wherein the processor is configured to:

specify a selection diagnostic item that is the diagnostic item selected by a user among the plurality of diagnostic items;

rearrange the diagnosis result corresponding to the selection diagnostic item such that the diagnosis result is arranged in the predetermined order, in rearranging the plurality of diagnosis results; and generate the screen in which the diagnosis result corresponding to the selection diagnostic item is arranged in the predetermined order, in generating the screen.

9. The information processing system according to claim 1, wherein information regarding a group to which the diagnostic item belongs is associated with each of the plurality of diagnostic items, and the processor is configured to:

rearrange the diagnosis result corresponding to a dependent diagnostic item that is the diagnostic item belonging to a group selected by a user such that the diagnosis result is arranged in the predetermined order, in rearranging the plurality of diagnosis results; and generate the screen in which the diagnosis result corresponding to the dependent diagnostic item is arranged in the predetermined order, in generating the screen.

10. The information processing system according to claim 1, wherein the processor is configured to:

change the diagnosis result for the diagnostic item designated by a user based on an instruction from the user;

in a case where the diagnosis result is changed by the user, rearrange a plurality of diagnosis results including the changed diagnosis result such that the plurality of diagnosis results are arranged in the predetermined order; and generate the screen in which the plurality of diagnosis results including the changed diagnosis result are arranged in the predetermined order.

11. The information processing system according to claim 1, wherein the processor is configured to:

change the diagnosis result such that the stricter the strictness specified by the information regarding the strictness, the worse an evaluation of the diagnosis result for the designation diagnostic item, in changing the diagnosis result for the designation diagnostic item.

12. A non-transitory computer readable medium storing a program causing a computer to realize:

a function of acquiring a read image data from a scanner, wherein the scanner is configured to scan a chart image formed on a recording medium and generate the read image data;

a function of generating a diagnosis result for each of a plurality of diagnostic items based on analysis of the read image data and a difference between the read image data and a predetermined reference value corresponding to each of the plurality of diagnostic items;

a function of acquiring the diagnosis result for each of the plurality of diagnostic items, the diagnosis result being a result of diagnosing an image formed on a recording medium;

a function of rearranging the acquired plurality of diagnosis results such that the plurality of diagnosis results are arranged in a predetermined order;

a function of generating a screen in which the plurality of diagnosis results are arranged in the predetermined order;

a function of acquiring information regarding strictness of diagnosis for a designation diagnostic item that is the diagnostic item designated by a user, from the user;

a function of changing the diagnosis result for the designation diagnostic item based on the acquired information regarding the strictness;

a function of rearranging a plurality of diagnosis results including the changed diagnosis result for the designation diagnostic item such that the plurality of diagnosis results are arranged in the predetermined order; and a function of generating the screen in which the plurality of diagnosis results including the changed diagnosis result for the designation diagnostic item are arranged in the predetermined order.

13. An information processing method comprising:

acquiring a read image data from the scanner, wherein the scanner is configured to scan a chart image formed on a recording medium and generate the read image data;

generating a diagnosis result for each of a plurality of diagnostic items based on analysis of the read image data and a difference between the read image data and a predetermined reference value corresponding to each of the plurality of diagnostic items;

acquiring the diagnosis result for each of the plurality of diagnostic items, the diagnosis result being a result of diagnosing an image formed on a recording medium;

rearranging the acquired plurality of diagnosis results such that the plurality of diagnosis results are arranged in a predetermined order;

generating a screen in which the plurality of diagnosis results are arranged in the predetermined order;

acquiring information regarding strictness of diagnosis for a designation diagnostic item that is the diagnostic item designated by a user, from the user;

changing the diagnosis result for the designation diagnostic item based on the acquired information regarding the strictness;

rearranging a plurality of diagnosis results including the changed diagnosis result for the designation diagnostic item such that the plurality of diagnosis results are arranged in the predetermined order; and generating the screen in which the plurality of diagnosis results including the changed diagnosis result for the designation diagnostic item are arranged in the predetermined order.

* * * * *